(12) United States Patent
Tanaka et al.

(10) Patent No.: US 12,253,712 B2
(45) Date of Patent: Mar. 18, 2025

(54) ILLUMINATION DEVICE AND DISPLAY DEVICE

(71) Applicant: Japan Display Inc., Tokyo (JP)

(72) Inventors: Yoshinori Tanaka, Tokyo (JP); Keita Ono, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/613,218

(22) Filed: Mar. 22, 2024

(65) Prior Publication Data

US 2024/0329294 A1 Oct. 3, 2024

(30) Foreign Application Priority Data

Mar. 29, 2023 (JP) ................................. 2023-053674

(51) Int. Cl.
*G02F 1/1333* (2006.01)
*F21V 8/00* (2006.01)
*G02F 1/13357* (2006.01)

(52) U.S. Cl.
CPC ..... *G02B 6/0091* (2013.01); *G02F 1/133302* (2021.01); *G02F 1/133615* (2013.01)

(58) Field of Classification Search
CPC ............. G02F 1/1333; G02F 1/133302; G02F 1/133305; G02F 1/133311; G02F 1/1336; G02F 1/133615; G02B 6/0091
See application file for complete search history.

(56) References Cited

U.S. PATENT DOCUMENTS

| | | | | |
|---|---|---|---|---|
| 6,048,071 | A * | 4/2000 | Sawayama | ........... G02B 6/0018 349/63 |
| 2019/0086601 | A1* | 3/2019 | Zhang | ................. G02B 6/0055 |
| 2019/0154901 | A1* | 5/2019 | Lee | ........................ G02B 6/005 |
| 2021/0341663 | A1 | 11/2021 | Fukuoka | |

FOREIGN PATENT DOCUMENTS

JP 2020-101684 A 7/2020

* cited by examiner

*Primary Examiner* — Thoi V Duong
(74) *Attorney, Agent, or Firm* — Michael Best & Friedrich LLP

(57) ABSTRACT

According to one embodiment, an illumination device emits light toward a display panel and includes a transparent substrate having a first main surface opposed to the display panel, a second main surface on a side opposite to the first main surface, and a first side surface connecting the first main surface with the second main surface, and a light source emitting light toward the first side surface. The first side surface has a first intersection surface intersecting a thickness direction from the first main surface to the second main surface.

3 Claims, 23 Drawing Sheets

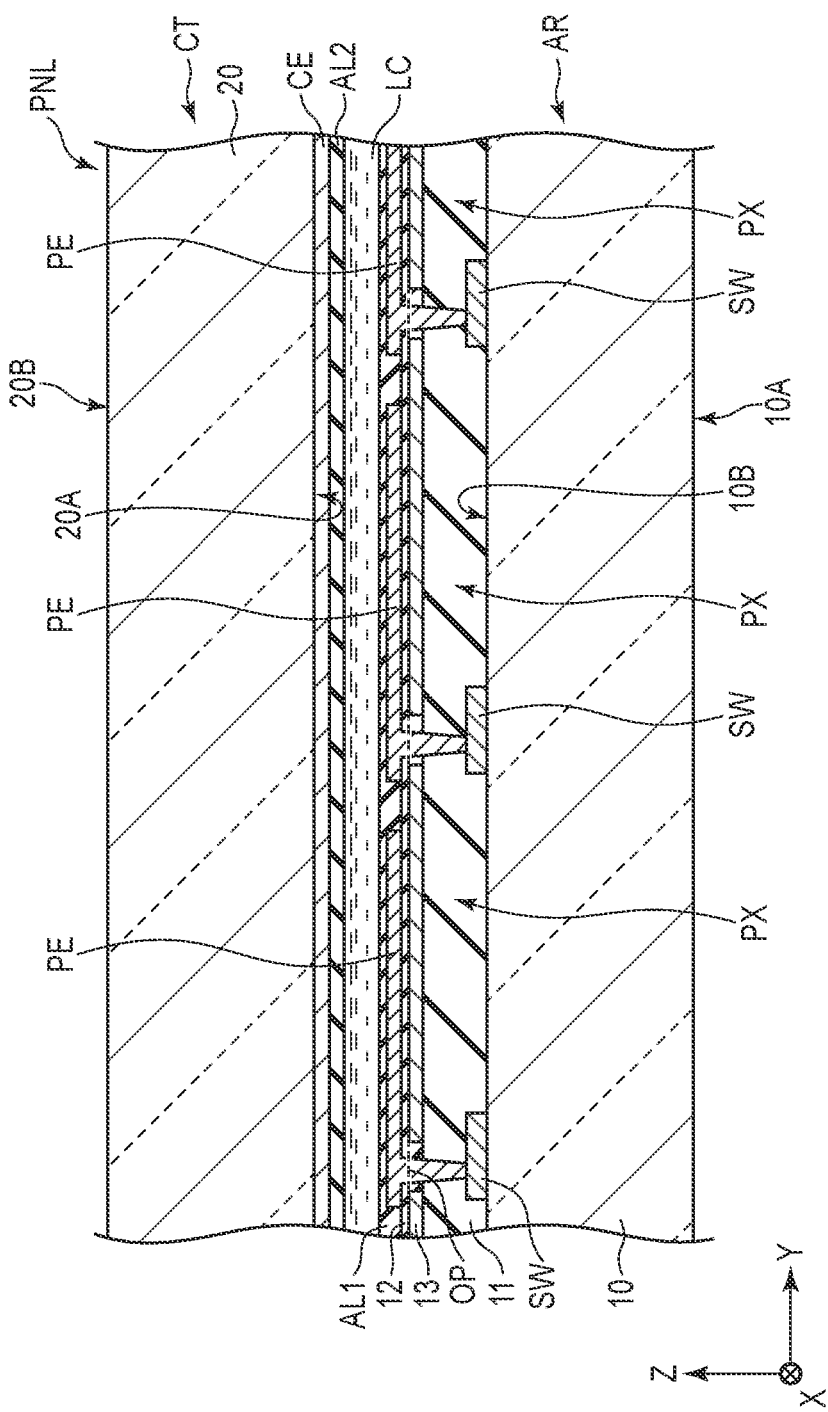
F I G. 2

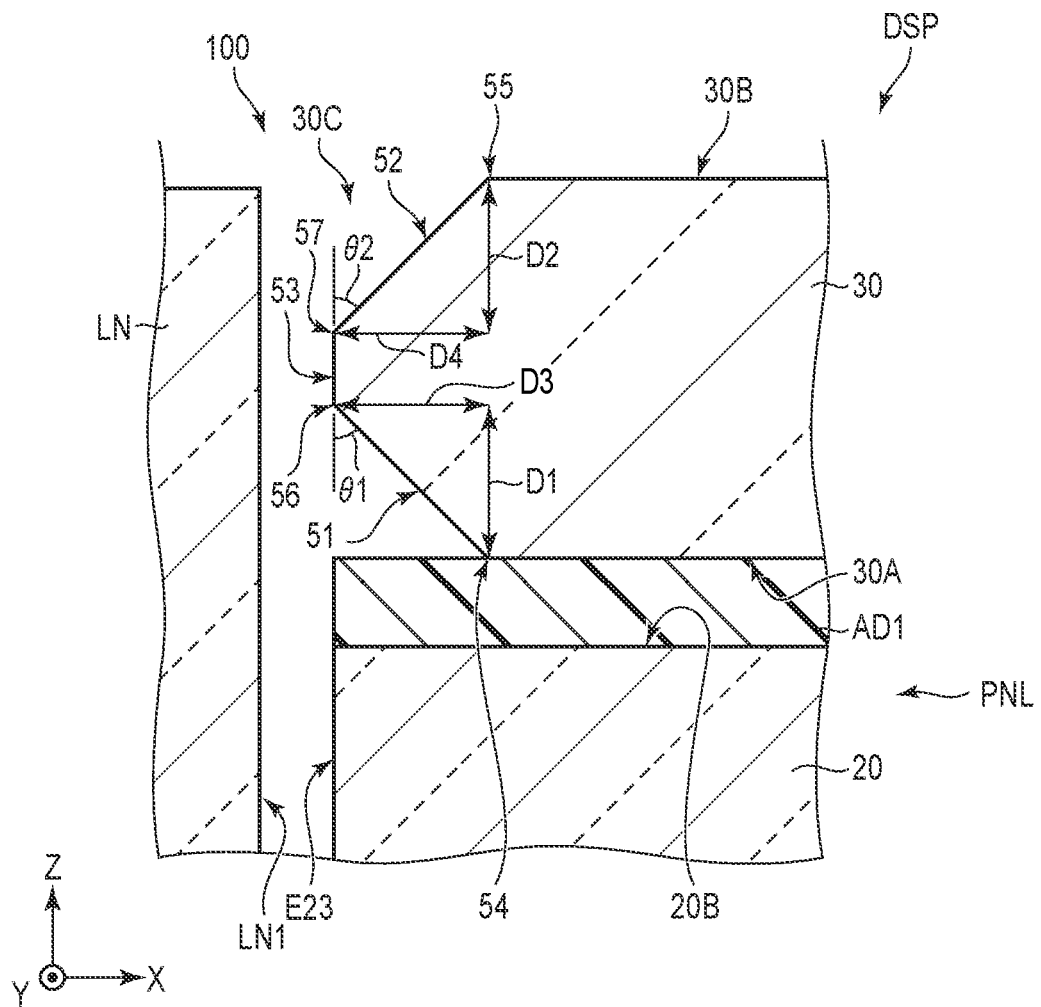
F I G. 5

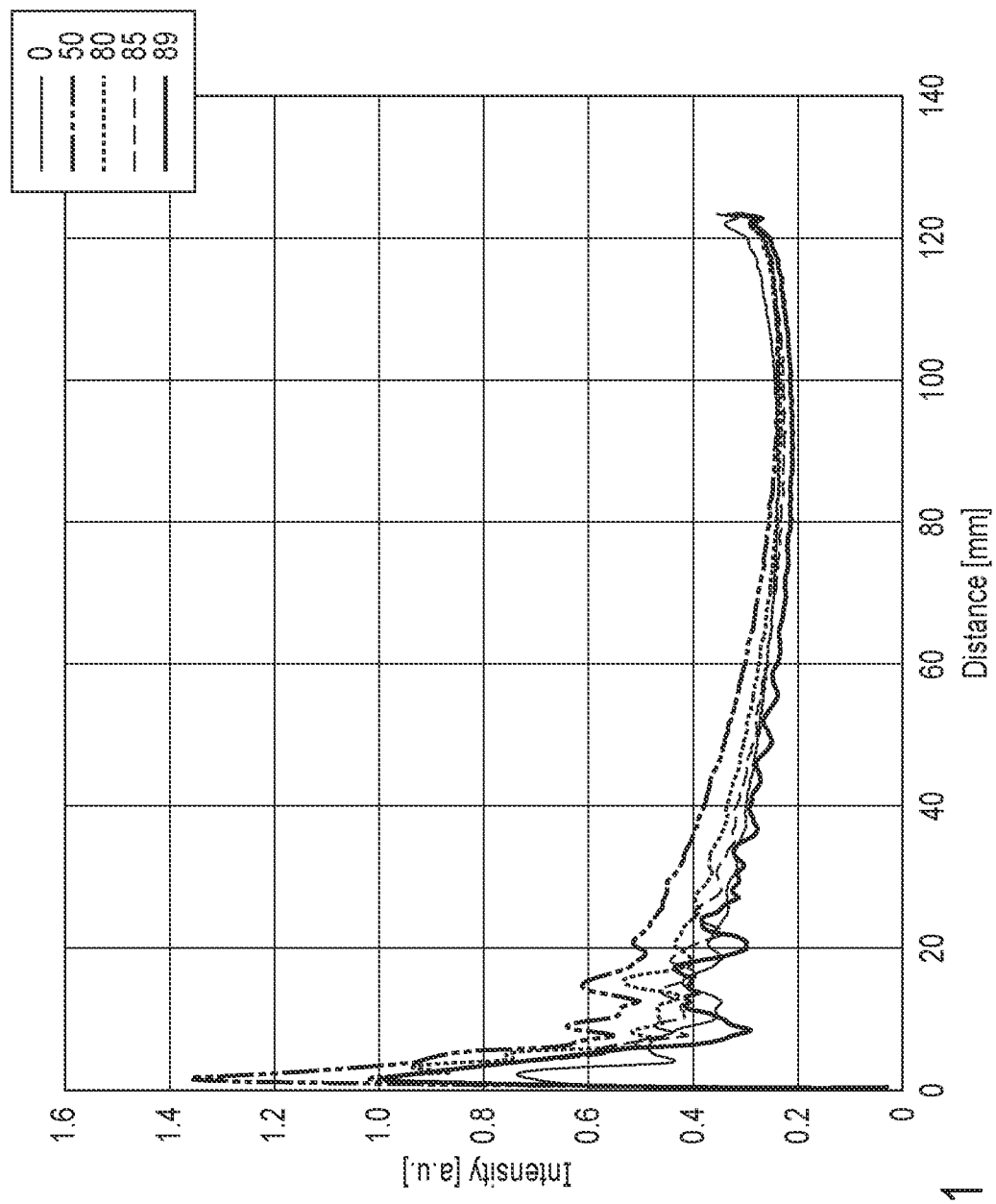
F I G. 11

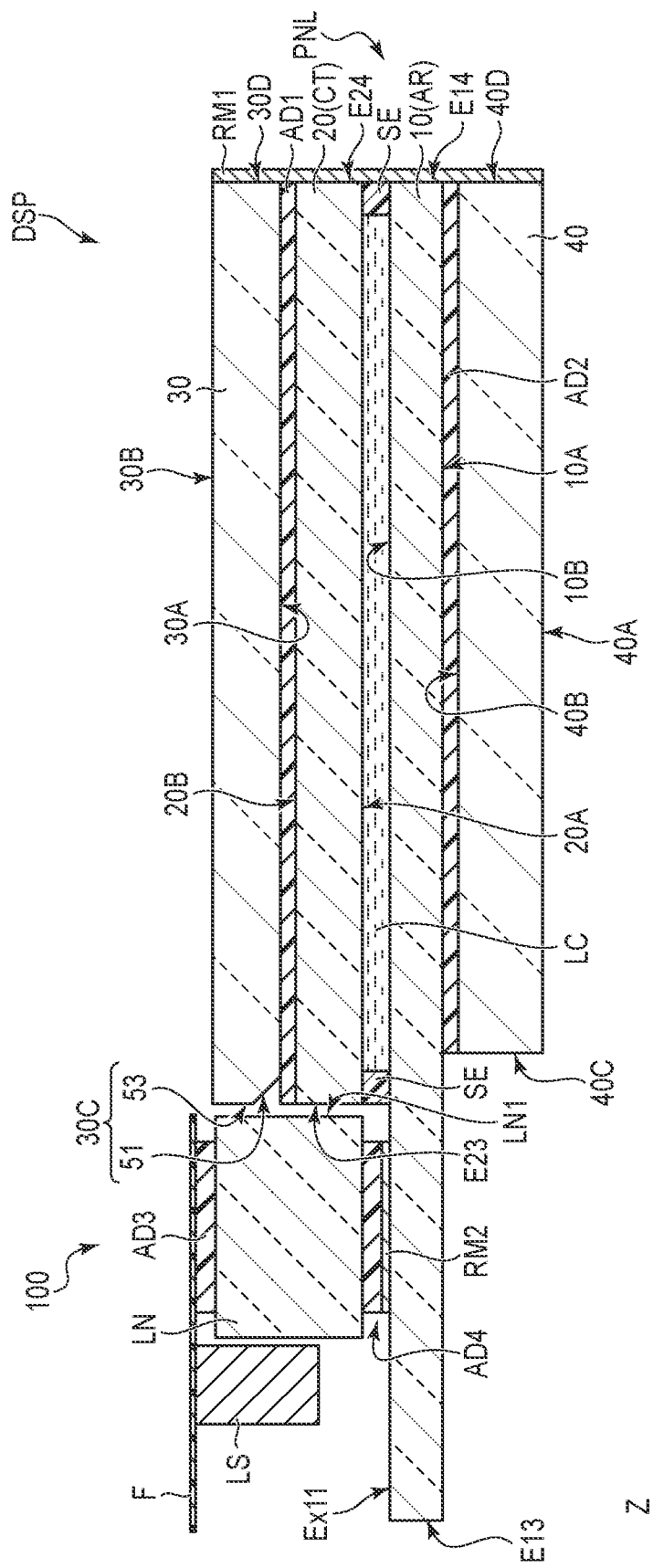
F I G. 12

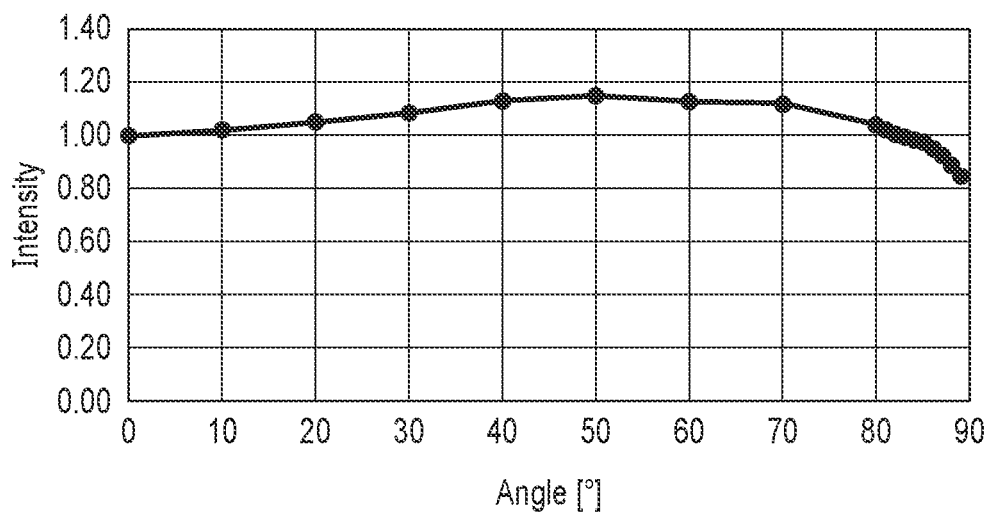
F I G. 16
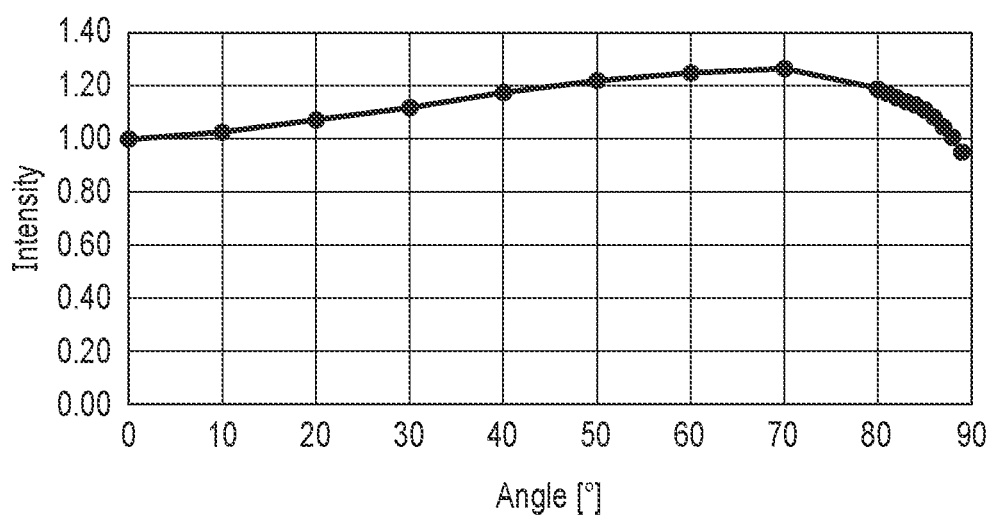
F I G. 17

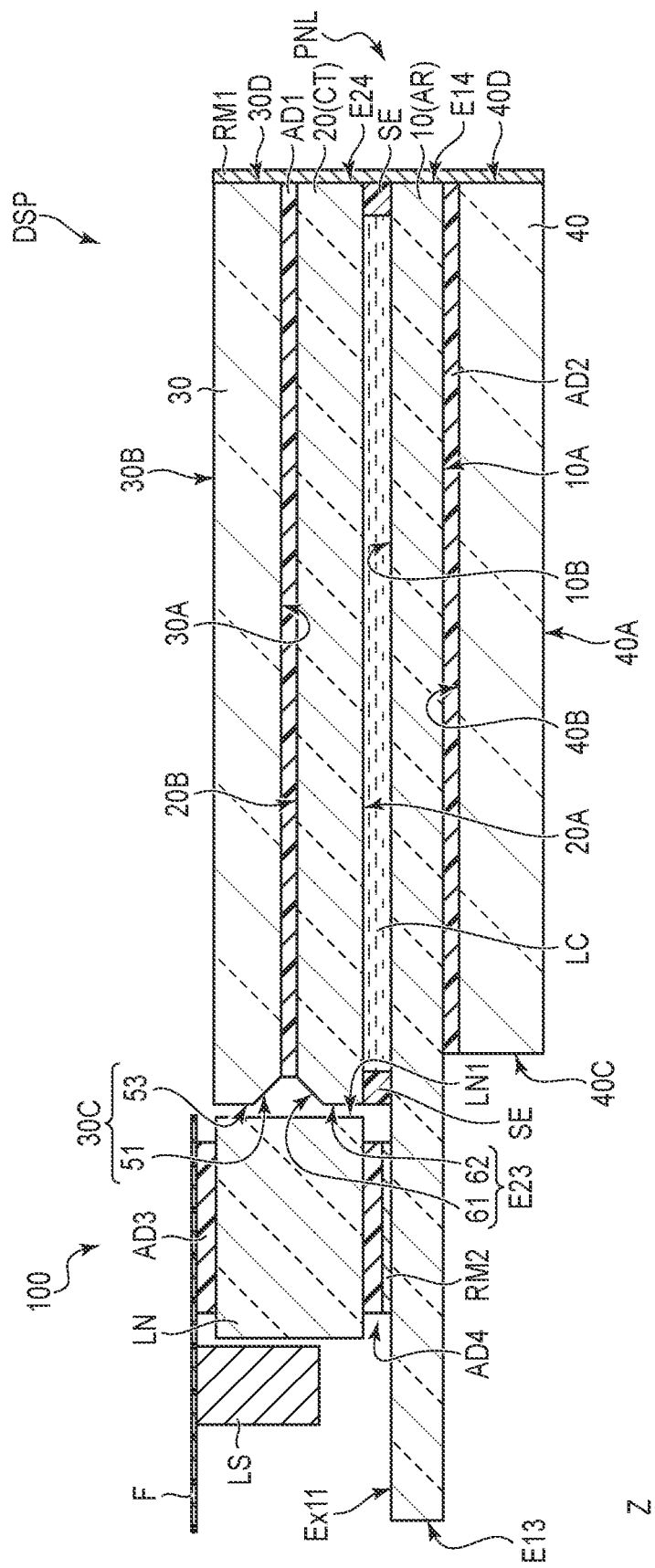
F I G. 19

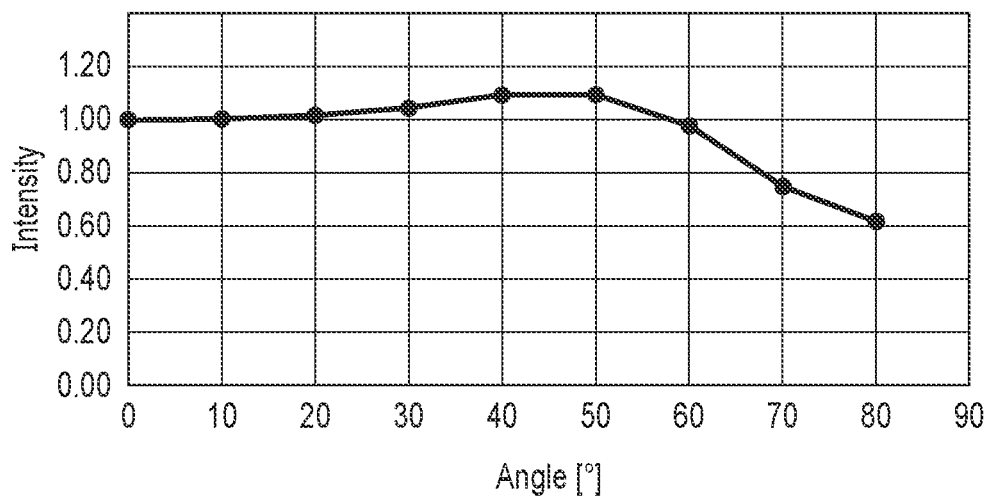
F I G. 21
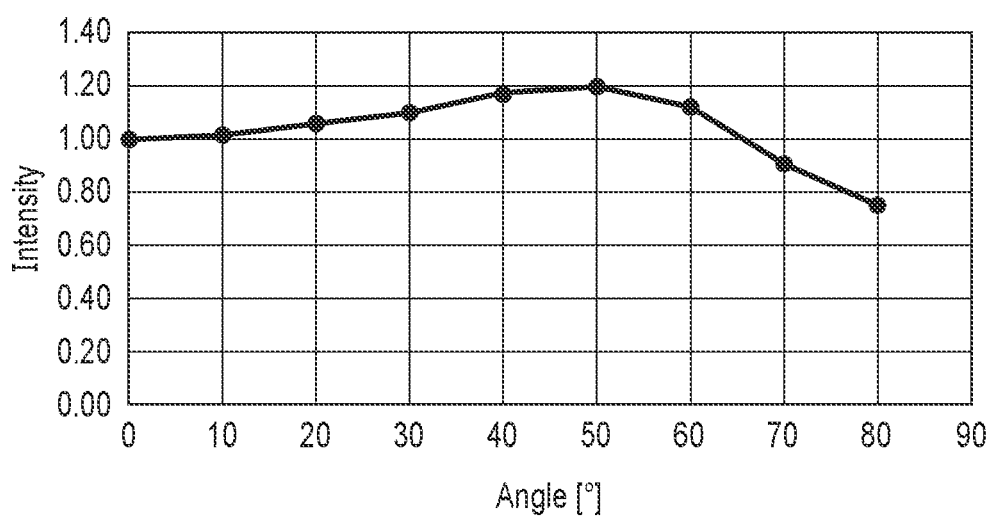
F I G. 22

ILLUMINATION DEVICE AND DISPLAY DEVICE

CROSS-REFERENCE TO RELATED APPLICATIONS

This application is based upon and claims the benefit of priority from Japanese Patent Application No. 2023-053674, filed Mar. 29, 2023, the entire contents of which are incorporated herein by reference.

FIELD

Embodiments described herein relate generally to an illumination device and a display device.

BACKGROUND

In recent embodiment, a display device comprising a display panel including a polymer dispersed liquid crystal layer (PDLC) and light source has been proposed (for example, Patent Literature 1 and Patent Literature 2). The polymer dispersed liquid crystal layer can switch a scattering state in which light is scattered and a transparent state in which light is transmitted. By switching the display panel to the scattering state, the display device can display images. On the other hand, by switching the display panel to the transparent state, the user can see the background through the display panel.

BRIEF DESCRIPTION OF THE DRAWINGS

FIG. 2 is a cross-sectional view showing a configuration example of the display panel shown in FIG. 1.
FIG. 5 is a partially enlarged view showing a V portion shown in FIG. 4.
FIG. 11 is a chart showing a simulation result.
FIG. 12 is a cross-sectional view schematically showing a display device according to a second embodiment.
FIG. 16 is a chart showing a simulation result.
FIG. 17 is a chart showing a simulation result.
FIG. 19 is a cross-sectional view schematically showing a display device according to a fourth embodiment.
FIG. 21 is a chart showing a simulation result.
FIG. 22 is a chart showing a simulation result.

DETAILED DESCRIPTION

Figure 1:
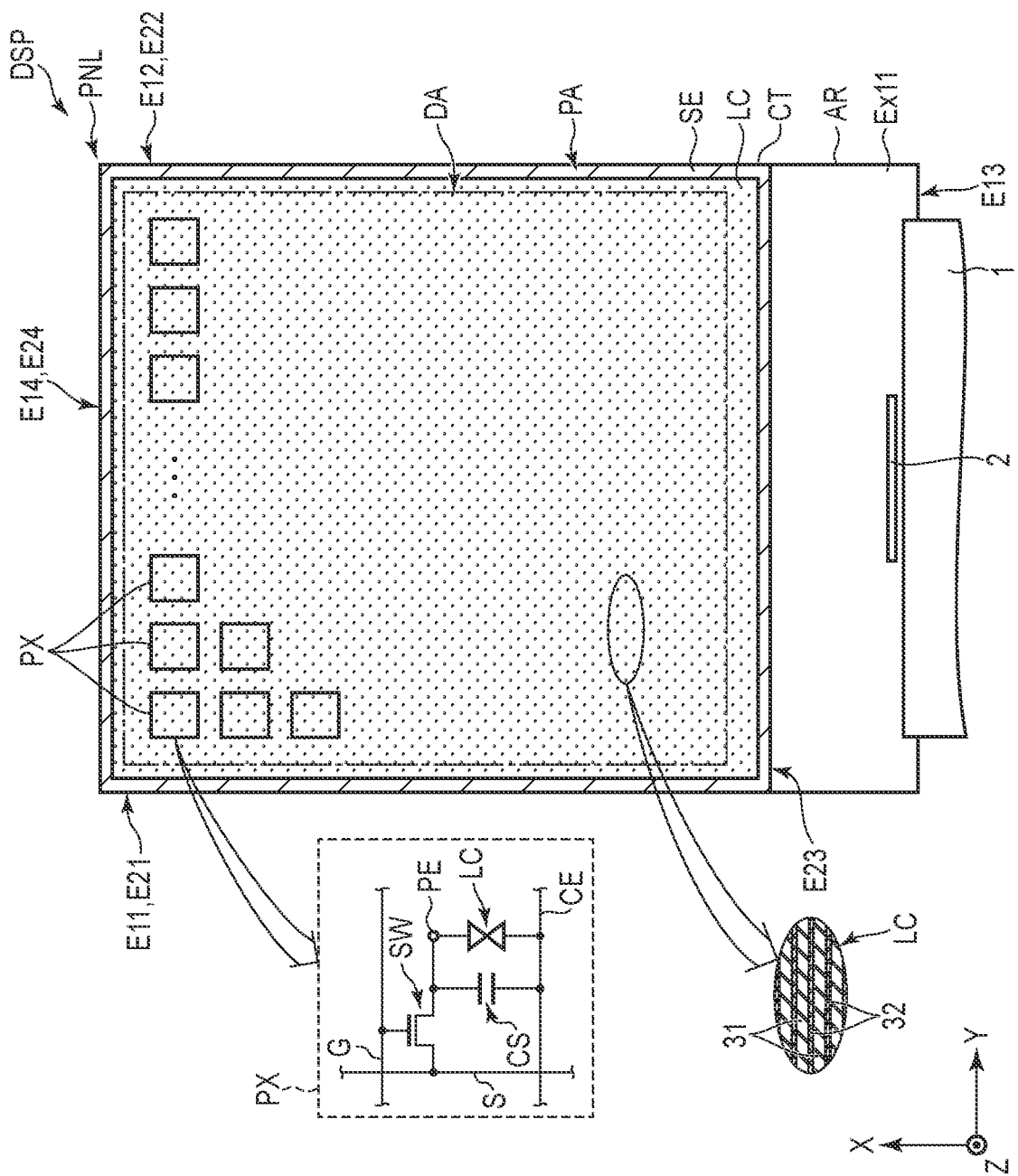
FIG. 1 is a plan view showing a configuration example of a display device.

In general, according to one embodiment, an illumination device irradiates light toward a display panel and comprises a transparent substrate having a first main surface opposed to the display panel, a second main surface on a side opposite to the first main surface, and a first side surface connecting the first main surface with the second main surface, and a light source emitting light toward the first side surface, and the first side surface has a first intersection surface intersecting a thickness direction from the first main surface to the second main surface.

A display panel according to another embodiment comprises a display panel including a liquid crystal layer and the illumination device overlapping with the display panel.

According to these configurations, an illumination device and a display device that are capable of increasing the display quality can be provided.

Embodiments will be described hereinafter with reference to the accompanying drawings. The disclosure is merely an example, and proper changes within the spirit of the invention, which are easily conceivable by a person of ordinary skill in the art, are included in the scope of the invention as a matter of course. In addition, in some cases, in order to make the description clearer, the drawings are schematically illustrated as compared to the actual modes, but the schematic illustration merely shows an example and adds no restriction to the interpretation of the invention.

In the drawings, reference numbers of continuously arranged elements equivalent or similar to each other are omitted in some cases. In addition, in the specification and drawings, structural elements which function in the same or a similar manner to those described in connection with preceding drawings are denoted by like reference numbers, detailed description thereof being omitted unless necessary.

In each of the embodiments, a first direction X, a second direction Y, and a third direction Z are defined as shown in each of the drawings. The first direction X, the second direction Y, and the third direction Z are orthogonal to each other, but may intersect each other at an angle other than 90 degrees. Viewing an X-Y plane defined by the first direction X and the second direction Y is hereinafter referred to as plan view.

In each of the embodiments, a liquid crystal display device which enables a background to be visually recognized, to which polymer dispersed liquid crystal is applied, is disclosed as an example of the display device. Incidentally, each embodiment does not prevent application of individual technical ideas disclosed in each embodiment to other types of display devices.

First Embodiment

FIG. 1 is a plan view showing a configuration example of a display device DSP. The display device DSP comprises a display panel PNL including a polymer dispersed liquid crystal layer (hereinafter simply referred to as a liquid crystal layer LC), a wiring board 1, and an IC chip 2.

The display panel PNL includes an array substrate AR, a counter-substrate CT opposed to the array substrate AR, a liquid crystal layer LC, and a seal SE. The array substrate AR and the counter-substrate CT are formed in flat plate shapes parallel to the X-Y plane. The array substrate AR and the counter-substrate CT overlap in plan view. The array substrate AR and the counter substrate CT are bonded to each other by a seal SE.

The liquid crystal layer LC is arranged between the array substrate AR and the counter-substrate CT and is sealed by the seal SE. In FIG. 1, the liquid crystal layer LC is represented by dots and the seal SE is represented by hatch lines. As enlarged and schematically shown in FIG. 1, the liquid crystal layer LC contains polymer 31 and liquid crystal molecules 32. As one example, the polymer 31 is liquid crystal polymer. The polymer 31 is formed in a stripe shape extending along the second direction Y and is aligned in the first direction X.

The liquid crystal molecules 32 are dispersed in gaps of the polymer 31 and aligned such that their long axes extend along the second direction Y. Each of the polymer 31 and the liquid crystal molecules 32 has optical anisotropy or refractive anisotropy. The response performance of the polymer 31 to the electric field is lower than the response performance of the liquid crystal molecules 32 to the electric field.

As an example, the alignment direction of the polymer 31 is hardly varied irrespective of the presence or absence of the electric field. In contrast, the alignment direction of the liquid crystal molecules 32 is changed in accordance with the electric field in a state in which a voltage higher than or equal to a threshold value is applied to the liquid crystal layer LC.

For example, in a state in which the voltage is not applied to the liquid crystal layer LC, optical axes of the polymer 31 and the liquid crystal molecules 32 are parallel to each another and the light made incident on the liquid crystal layer LC is not substantially scattered in the liquid crystal layer LC and transmitted (transparent state).

In a state in which the voltage is applied to the liquid crystal layer LC, the optical axes of the polymer 31 and the liquid crystal molecules 32 intersect each other and the light made incident on the liquid crystal layer LC is scattered in the liquid crystal layer LC (scattered state). In other words, in the liquid crystal layer LC, the transparent state and the scattered state can be switched in accordance with the applied voltage.

The display panel PNL includes a display area DA in which images are displayed and a surrounding area PA which surrounds the display area DA. The seal SE is located in the surrounding area PA. The display area DA includes pixels PX arrayed in a matrix in the first direction X and the second direction Y.

As shown and enlarged in FIG. 1, each pixel PX comprises a switching element SW, a pixel electrode PE, a common electrode CE, the liquid crystal layer LC, and the like. The switching element SW is constituted by, for example, a thin-film transistor (TFT) and is electrically connected to a scanning line G and a signal line S.

The scanning line G is electrically connected to the switching element SW in each of the pixels PX arranged in the second direction Y. The signal line S is electrically connected to the switching element SW in each of the pixels PX arranged in the first direction X.

The pixel electrode PE is electrically connected to the switching element SW. The common electrode CE is provided in common for a plurality of pixel electrodes PE. The liquid crystal layer LC (particularly, liquid crystal molecules 32) is driven by an electric field produced between the pixel electrode PE and the common electrode CE. A capacitor CS is formed, for example, between the common electrode CE and an electrode having the same potential and between the pixel electrode PE and an electrode having the same potential.

The scanning line G, the signal line S, the switching element SW, and the pixel electrode PE are provided on the array substrate AR, and the common electrode CE is provided on the counter-substrate CT, which will be described below with reference to FIG. 2. On the array substrate AR, the scanning line G and the signal line S are electrically connected to the wiring board 1 or the IC chip 2.

The array substrate AR has a pair of side surfaces E11 and E12 extending in the first direction X and a pair of side surfaces E13 and E14 extending in the second direction Y. In the example shown in FIG. 1, the pair of side surfaces E11 and E12 are side surfaces formed along the long sides of the display panel PNL, and the pair of side surfaces E13 and E14 are side surfaces formed along the short sides of the display panel PNL.

The counter-substrate CT has a pair of side surfaces E21 and E22 extending in the first direction X and a pair of side surfaces E23 and E24 extending in the second direction Y. In the example shown in FIG. 1, the pair of side surfaces E21 and E22 are side surfaces formed along the long sides, and the pair of side surfaces E23 and E24 are side surfaces formed along the short sides.

In the example shown in FIG. 1, the side surface E11 overlaps with the side surface E21 in plan view, but may not overlap with the side surface E21. In the example shown in FIG. 1, the side surface E12 overlaps with the side surface E22 in plan view, but may not overlap with the side surface E22. In the example shown in FIG. 1, the side surface E14 overlaps with the side surface E24 in plan view, but may not overlap with the side surface E24.

The array substrate AR includes an extending portion Ex11 which extends beyond the side surface E23 of the counter-substrate CT. From another viewpoint, the extending portion Ex11 does not overlap with the counter-substrate CT. The extended portion Ex11 is located between the side surface E13 and the side surface E23. The wiring board 1 and the IC chip 2 are mounted on the extending portion Ex11.

The wiring board 1 is, for example, a flexible printed circuit which can be bent. The IC chip 2 incorporates, for example, a display driver which outputs signals necessary for image display, and the like. The IC chip 2 may be mounted on the wiring board 1.

In the example shown in FIG. 1, the display device DSP comprises a single wiring board 1, but may comprise a plurality of wiring boards. The display device DSP comprises a single IC chip 2, but may comprise a plurality of IC chips.

FIG. 2 is a cross-sectional view showing a configuration example of the display panel PNL shown in FIG. 1. The array substrate AR includes a transparent substrate 10, insulating films 11 and 12, a capacitive electrode 13, switching elements SW, the pixel electrodes PE, and an alignment film AL1. The transparent substrate 10 has a main surface 10A and a main surface 10B on a side opposite to the main surface 10A. The main surface 10A and the main surface 10B are connected to each other by the pair of side surfaces E11 and E12 (shown in FIG. 1) and the pair of side surfaces E13 and E14 (shown in FIG. 1).

The switching elements SW are provided on the main surface 10B. The insulating film 11 is provided on the main surface 10B and covers the switching elements SW. The scanning line G and the signal line S described with reference to FIG. 1 are provided between the transparent substrate 10 and the insulating film 11, but their illustration is omitted here. The capacitive electrode 13 is provided between the insulating film 11 and an insulating film 12.

The pixel electrodes PE are provided in the respective pixels PX between the insulating film 12 and the alignment film AL1. From another viewpoint, the capacitive electrode 13 is provided between the transparent substrate 10 and the pixel electrodes PE.

The pixel electrodes PE are electrically connected to the switching elements SW through apertures OP of the capacitive electrode 13. The pixel electrodes PE overlap with the capacitive electrode 13 through the insulating film 12 to form the capacitors CS of the pixels PX. The alignment film AL1 covers the pixel electrodes PE.

The counter-substrate CT includes a transparent substrate 20, the common electrode CE, and an alignment film AL2. The transparent substrate 20 has a main surface 20A and a main surface 20B (third main surface) on a side opposite to the main surface 20A. The main surface 20A of the transparent substrate 20 is opposed to the main surface 10B of the transparent substrate 10. The main surface 20A and the main surface 20B are connected by the pair of side surfaces E21 and E22 (shown in FIG. 1) and the pair of side surfaces E23 and E24 (shown in FIG. 1).

The common electrode CE is provided on the main surface 20A. The alignment film AL2 covers the common electrode CE. The liquid crystal layer LC is located between the main surface 10B and the main surface 20A and is in contact with the alignment film AL1 and the alignment film AL2.

In the counter-substrate CT, a light-shielding layer may be provided just above each of the switching elements SW, the scanning lines G, and the signal lines S. A transparent insulating film may be provided between the transparent substrate 20 and the common electrode CE or between the common electrode CE and the alignment film AL2.

The common electrode CE is arranged over the plurality of pixels PX and is opposed to the plurality of pixel electrodes PE. The common electrode CE has the same potential as the capacitive electrode 13. The liquid crystal layer LC is located between the pixel electrodes PE and the common electrode CE.

The transparent substrates 10 and 20 are, for example, glass substrates but may be insulating substrates such as plastic substrates. The main surfaces 10A and 10B, and the main surfaces 20A and 20B are the surfaces substantially parallel to the X-Y plane. In this case, being substantially parallel means being parallel in a design concept and indicates including variation in angle caused by a manufacturing process since implementing an ideal parallel state in the manufacturing is difficult.

The insulating film 11 includes, for example, a transparent inorganic insulating film of silicon oxide, silicon nitride, silicon oxynitride or the like, and a transparent organic insulating film of acrylic resin or the like. The insulating film 12 is, for example, a transparent inorganic insulating film of silicon nitride or the like. The capacitive electrode 13, the pixel electrodes PE, and the common electrode CE are, for example, transparent electrodes formed of a transparent conductive material such as indium tin oxide (ITO) or indium zinc oxide (IZO).

The alignment films AL1 and AL2 are horizontal alignment films having an alignment restriction force substantially parallel to the X-Y plane. As an example, the alignment films AL1 and AL2 are subjected to alignment treatment in the second direction Y. The alignment treatment may be a rubbing treatment or an optical alignment treatment.

Figure 3:
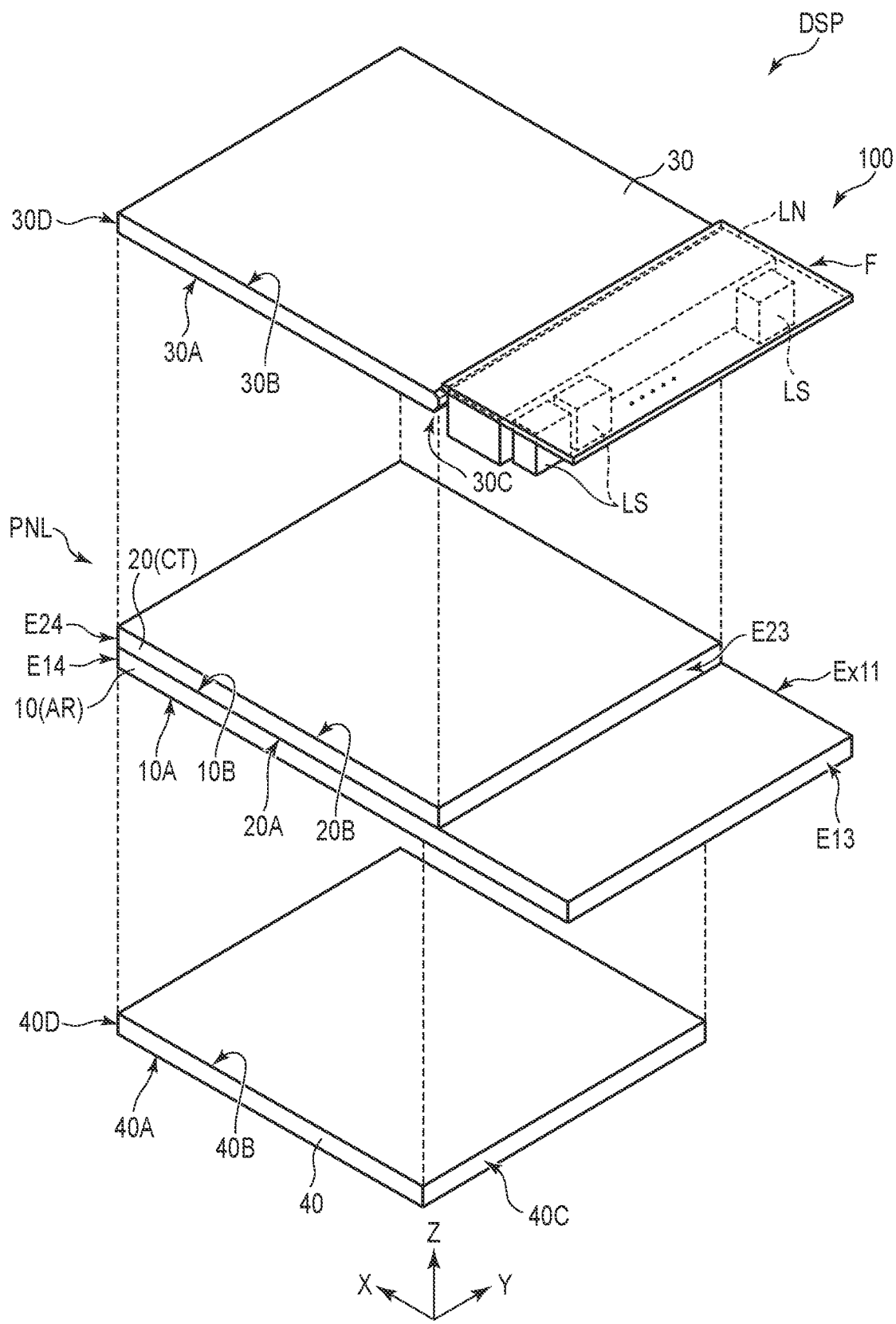
FIG. 3 is an exploded perspective view showing main portions of a display device according to a first embodiment.

FIG. 3 is an exploded perspective view showing main portions of the display device DSP according to the present embodiment. In FIG. 3, the wiring board 1 and the like are omitted. As described with reference to FIG. 1, the display device DSP comprises the display panel PNL.

The display panel DSP further comprises an illumination device 100 irradiating light toward the display panel, and a transparent substrate 40. The illumination device 100 comprises a transparent substrate 30, a plurality of light sources LS, and a lens LN.

The transparent substrate 30 overlaps with the display panel PNL. The transparent substrate 30 has approximately rectangular shape in plan view. The size of the transparent substrate 30 is, for example, substantially equal to the size of the transparent substrate 20 in plan view. The transparent substrate 30 has a main surface 30A (first main surface), a main surface 30B (second main surface) on a side opposite to the main surface 30A, a side surface 30C (first side surface) that connects the main surface 30A with the main surface 30B, and a side surface 30D on a side opposite to the side surface 30C. The side surfaces 30C and 30D are surfaces extending in the second direction Y.

The main surfaces 30A and 30B are surfaces substantially parallel to the X-Y plane. The main surface 30A is opposed to the main surface 20B of the transparent substrate 20. A direction from the main surface 30A to the main surface 30B corresponds to the third direction Z. In the present embodiment, the third direction Z corresponds to the thickness direction.

The side surface 30D is a surface substantially parallel to a Y-Z plane defined by the second direction Y and the third direction Z. The surfaces including the side surface 30D other than the side surface 30C are mirror finished. As a result, light emission from the side surfaces including the side surfaces 30D other than the side surface 30C is suppressed.

The transparent substrate 40 overlaps with the display panel PNL on a side opposite to the transparent substrate 30 in the third direction Z. The transparent substrate 40, the array substrate AR, the counter-substrate CT, and the transparent 30 are aligned in this order along the third direction Z. In the third direction Z, the transparent substrates 30 and 40 do not overlap with the extending portion Ex11.

The transparent substrate 40 has approximately rectangular shape in plan view. The transparent substrate 40 has a main surface 40A, a main surface 40B on a side opposite to the main surface 40A, a side surface 40C that connects the main surface 40A with the main surface 40B, and the side surface 40D on a side opposite to the side surface 40C. The side surfaces 40C and 40D are side surfaces extending in the second direction Y.

The main surfaces 40A and 40B are surfaces substantially parallel to the X-Y plane. The main surface 40B is opposed to the main surface 10A of the transparent substrate 10. The side surfaces 40C and 40D are substantially parallel to the Y-Z plane.

The transparent substrates 30 and 40 are, for example, glass substrates but may be insulating substrates such as plastic substrates. In the example shown in FIG. 3, the size of the transparent substrate 30 is greater than the size of the transparent substrate 40 in plan view. The size of the transparent substrate 30 may be smaller than or equal to the size of the transparent substrate 40 in plan view.

In the example shown in FIG. 3, the plurality of light sources LS and the lenses LN overlap with the extending portion Ex11 in plan view. The plurality of light sources LS are spaced apart from each other and arranged along the second direction Y. In the light sources LS, red LEDs, green LEDs, and blue LEDs are continuously aligned. The light source LS are not limited to an arrangement in which LEDs of three different colors are continuously aligned, but only white light sources emitting white light may be continuously aligned.

The lens LN (for example, a prismatic lens) is formed as a transparent rod and extends in the second direction Y. The lens LN is formed of, for example, resin. The lens LN has, for example, a plurality of curved surfaces corresponding to the plurality of light sources LS.

The lens LN may be composed of a plurality of lenses. The number of light sources LS and the number of lenses LN are not limited to the examples shown in the figure. The side surface 30C on which light is emitted from the plurality of the light sources LS is referred to as an incidence side, and the side surface 30D on a side opposite to the side surface 30C may be referred to as an opposite incidence side.

The display device DSP further comprises a wiring board F. The plurality of light sources LS are mounted on the wiring board F. The wiring board F is, for example, a printed circuit board and is more rigid than the wiring board 1 shown in FIG. 1. The plurality of light sources LS and the lens LN are provided between the extending portion Ex11 and the wiring board F in the third direction Z.

Figure 4:
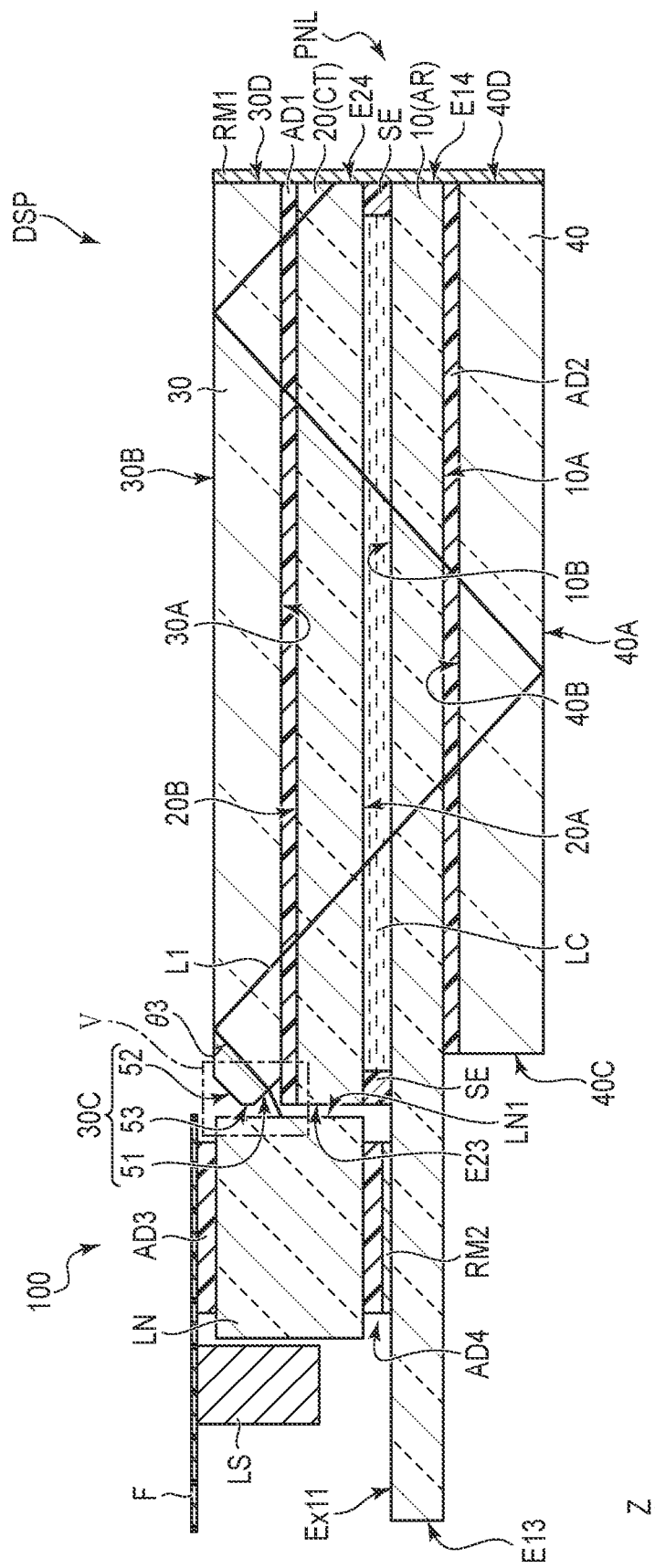
FIG. 4 is a cross-sectional view schematically showing a configuration example of the display device shown in FIG. 3.

FIG. 4 is a cross-sectional view schematically showing a configuration example of the display device DSP shown in FIG. 3. FIG. 5 is a partially enlarged view showing a V portion shown in FIG. 4. In FIG. 4, the wiring board 1, the IC chip 2, and the like are omitted. Incidentally, the only main parts of the display panel PNL are simplified and illustrated. FIG. 4 and FIG. 5 show the display device DSP viewed from the direction opposite to the second direction Y.

As described with reference to FIG. 3, the display device DSP comprises the display panel PNL and the illumination device 100. The display device DSP further comprises an adhesive layer AD1 and an adhesive layer AD2. The adhesive layer AD1 is located between the display panel PNL and the transparent substrate 30, and the adhesive layer AD2 is located between the display panel PNL and the transparent substrate 40, in the third direction Z.

The adhesive layer AD1 bonds the transparent substrate 30 to the display panel PNL. From another viewpoint, the adhesive layer AD1 is in contact with the main surface 30A of the transparent substrate 30 and the main surface 20B of the transparent substrate 20. The adhesive layer AD2 bonds the display panel PNL to the transparent substrate 40. From another viewpoint, the adhesive layer AD2 is in contact with the main surface 10A of the transparent substrate 10 and the main surface 40B of the transparent substrate 40.

The adhesive layers AD1 and AD2 are transparent and formed of, for example, optical clear adhesive (OCA). The adhesive layers AD1 and AD2 may be formed of optical clear resin (OCR).

The refractive index of each of the transparent substrates 10 and 20, the adhesive layers AD1 and AD2, and the transparent substrates 30 and 40 is equal. In this example, "equal" is not limited to a case where the difference in refractive index is zero, but indicates a case where the difference in refractive index is 0.05 or less. In one example, the refractive index of each of the cover glasses 10, 20, 30, and 40 is 1.51, the refractive index of each of the adhesive layers AD1 and AD2 is 1.474.

The display device DSP further comprises a reflective material RM1. The reflective material RM1 is located on a side opposite to the plurality of light sources LS in the first direction X. The reflective material RM1 is provided along the third direction z, from the side surface 40D to the side surface 30D. The reflective material RM1 is provided along the second direction Y. The reflective material RM1 is formed of, for example, a metallic material having light-reflecting properties, such as silver. The reflective material RM1 is, for example, a reflective tape.

The display device DSP further comprises an adhesive layer AD3 and an adhesive layer AD4. The adhesive layer AD3 bonds the lens LN to the wiring board F. The adhesive layer AD4 bonds the lens LN to the transparent substrate 10. The adhesive layers AD1 and AD2 are, for example, double-sided tapes.

In the example shown in FIG. 4, a reflective material RM2 is provided between the adhesive layer AD4 and the extending portion Ex11. The reflective material RM2 is formed of, for example, a metallic material having light-reflecting properties, such as silver. The reflective material RM2 may be a light-shielding member.

The light traveling toward the transparent substrate 10, of the light emitted from the lens LN, is reflected by the reflective material RM2 and does not reach the transparent substrate 10. Thus, the loss of light emitted from the light sources LS is suppressed.

The light source LS is opposed to the side surface E23 and the side surface 30C through the lens LN, in the first direction X. From another viewpoint, the lens LN is located between the transparent substrate 30 and the light source LS and between the transparent substrate 20 and the light source LS in the first direction X.

A side surface LN1 of the lens LN is opposed to the side surface E23 and the side surface 30C. The light source LS emits light toward the side surface E23 and the side surface 30C. The light emitted from the light source LS travels along a direction of an arrow indicative of the first direction X.

In the example shown in FIG. 4, the side surface 30D is located directly above the side surface E24 in the third direction Z. In the third direction Z, the side surface 40C is displaced with respect to the side surface E23, but may be located directly below the side surface E23. In the third direction Z, the side surface 40D is located directly below the side surface 30D, but may be displaced.

Next, the side surface 30C of the transparent substrate 30 will be described with reference to FIG. 5.

The side surface 30C has intersection surfaces 51 and 52 intersecting the third direction z, and a parallel surface 53 parallel to the third direction Z. In the present embodiment, the intersection surface 51 corresponds to the first intersection surface, and the intersection surface 52 corresponds to the second intersection surface.

The light emitted from the light source LS is made incident on the transparent substrate 30 from the intersection surfaces 51 and 52 and the parallel surface 30. The intersection surface 51 is connected to the main surface 30A, the intersection surface 52 is connected to the main surface 30B, and the parallel surface 53 is connected to the intersection surface 51 and the intersection surface 52.

In the present embodiment, the intersection surfaces 51 and 52 are flat surfaces inclined in the third direction Z. From another view point, the intersection surfaces 51 and 52 are flat surfaces inclined with respect to the Y-Z plane. The parallel surface 53 is located directly above the side surface E23 in the third direction Z.

The transparent substrate 30 further has a side 54 connected to the intersection surface 51 and the main surface 30A, a side 55 connected to the intersection surface 52 and the main surface 30B, a side 56 connected to the intersection surface 51 and the parallel surface 53, and a side 57 connected to the intersection surface 52 and the parallel surface 53. In the example shown in FIG. 5, the side 56 is located closer to the lens LN than the side 54, and the side 57 is located closer to the lens LN than the side 55.

For example, the intersection surfaces 51 and 52 are inclined so as to be spaced apart from each other along the first direction X. From another viewpoint, the distance along the third direction z between the intersection surface 51 and the intersection surface 52 increases along the first direction X at a constant rate. The intersection surface 52 is inclined in a direction different from the intersection surface 51 with respect to the third direction Z.

Viewed in the direction opposite to the second direction Y, an acute angle formed between the third direction Z and the intersection surface 51 is defined as angle θ1, and an acute angle formed between the third direction Z and the intersection surface 52 is defined as angle θ2. From another view point, the angle θ1 corresponds to an acute angle formed between the intersection surface 51 and the Y-Z plane, and the angle θ2 corresponds to an acute angle formed between the intersection surface 52 and the Y-Z plane. The angles θ1 and θ2 are constant in the second direction Y.

In the present embodiment, the angle θ1 is substantially equal to the angle θ2 (θ1=θ2). For example, the size of the intersection surface 51 is substantially equal to the size of the intersection surface 52. From another viewpoint, a distance D1 along the third direction Z between the side 54 and the side 56 is substantially equal to a distance D2 along the third direction Z between the side 55 and the side 57, and a distance D3 along the first direction X between the side 54 and the side 56 is substantially equal to a distance D4 along the first direction X between the side 55 and the side 57.

In the example shown in FIG. 5, the adhesive layer AD1 is located between the intersection surface 51 and the main surface 20B of the transparent substrate 20. From another viewpoint, the size of the adhesive layer AD1 is substantially equal to the size of the transparent substrate 20 in plan view. The adhesive layer AD1 may not be located between the intersection surface 51 and the main surface 20B of the transparent substrate 20.

The intersection surfaces 51 and 52 are formed, for example, by removing a corner portion at which the main surface 30B intersects the side surface 30C and a corner portion at which the main surface 30A intersects the side surface 30C. The display device DSP is formed, for example, by forming the transparent substrate 30 having the side surface 30C having the intersection surfaces 51 and 52 in advance by chamfering and bonding the transparent substrate 30 to the display panel PNL through the adhesive layer AD1.

The propagation of light in the display device DSP will be described.

The light emitted from the light source LS is moderately diffused on the lens LN, and is made incident on the transparent substrate 20 from the side surface E23 and is made incident on the transparent substrate 30 from the side surface 30C. The light traveling toward the main surface 30B, of the light made incident on the transparent substrate 30, is reflected on an interface between the transparent substrate 30 and the air layer.

The light traveling from the transparent substrate 30 toward the transparent substrate 20, of the light made incident on the transparent substrate 30, is made incident on the display panel PNL through the adhesive layer AD1. The light traveling from the transparent substrate 20 toward the transparent substrate 30, of the light made incident on the transparent substrate 20, is made incident on the transparent substrate 30 through the adhesive layer AD1 and is reflected on the interface between the transparent substrate 30 and the air layer.

The light made incident on the display panel PNL is transmitted through the transparent substrate 20, the liquid crystal layer LC, and the transparent substrate 10 in this order. The light transmitted through the transparent substrate 10, of the light made incident on the display panel PNL, is made incident on the transparent substrate 40 through the adhesive layer AD2. After reflected at an interface between the main surface 40A and the air layer, the light travels toward the display panel PNL.

Thus, the light made incident from the side surface E23 and the side surface 30C travels along the first direction X while repeatedly reflected at the interface between the transparent substrate 30 and the air layer and the interface between the transparent substrate 40 and the air layer. FIG. 4 shows propagation of light L1 made incident on the transparent substrate 30 from the intersection surface 51 as an example.

Since the display device DSP comprises the reflective material RM1, the light reaching the side surface 30D and the side surface 40D is scattered and reflected by the reflective material RM1 to travel toward the direction opposite to the first direction X. By providing the reflective material RM1, the light leakage to the outside is suppressed, and the light utilization efficiency can be improved by reusing the light.

The light made incident on the liquid crystal layer LC to which no voltage is applied is transmitted through the liquid crystal layer LC while hardly scattered. In contrast, the light made incident on the liquid crystal layer LC to which the voltage is applied is scattered in the liquid crystal layer LC. The display device DSP allows images to be observed from the main surface 30B side and also allows images to be observed from the main surface 40A side.

The display device DSP is a so-called transparent display, and even when the display device DSP is observed from the main surface 30B side or observed from the main surface 40A side, a background of the display device DSP can be observed through the display device DSP.

Figure 6:
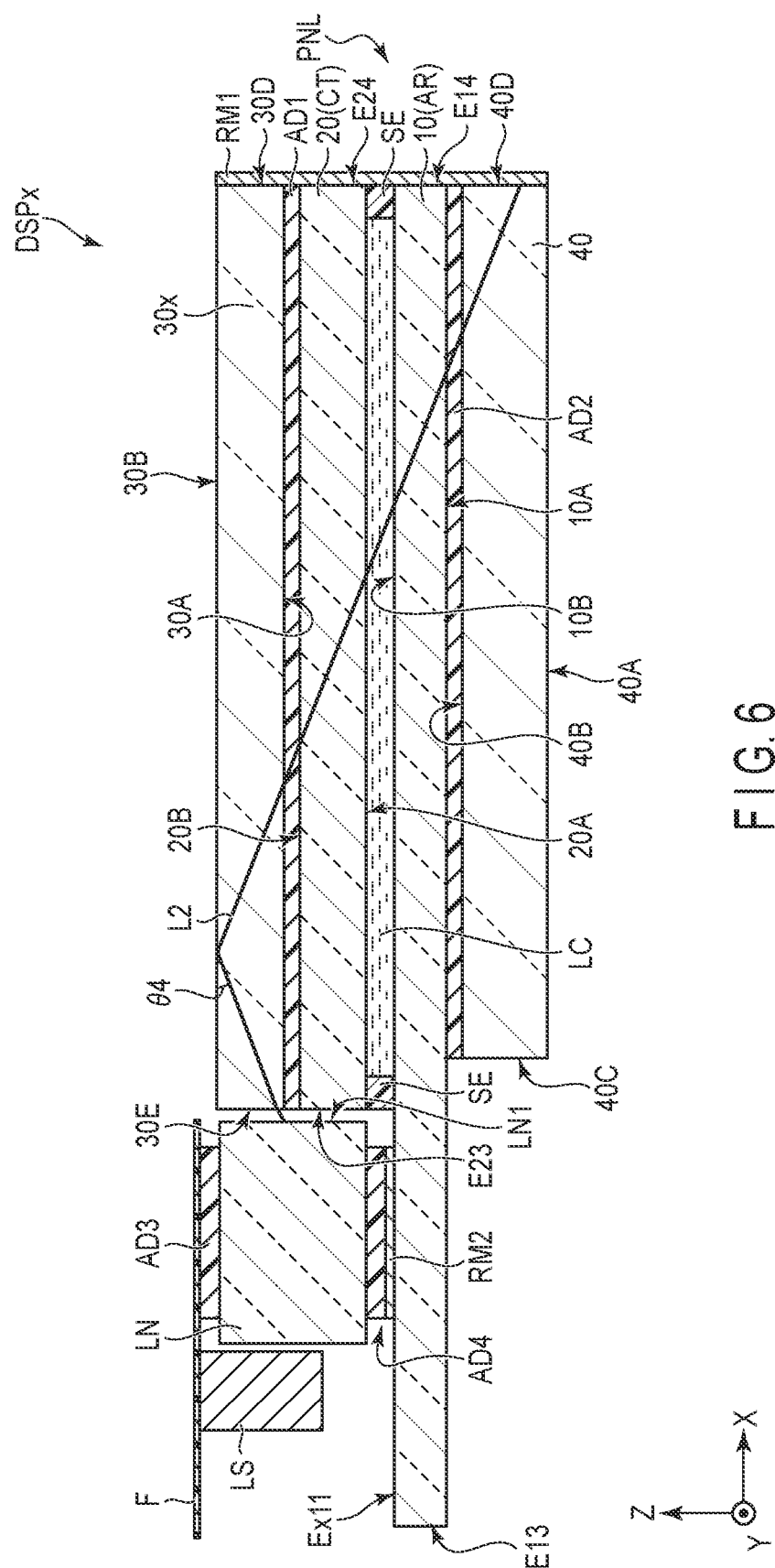
FIG. 6 is a cross-sectional view schematically showing a display device according to a comparative example.

FIG. 6 is a cross-sectional view schematically showing a display device DSPx according to a comparative example. A transparent substrate 30x, which the display device DSPx comprises, has a side surface 30E. The side surface 30E does not have surfaces corresponding to the intersection surfaces 51 and 52 described above, and are flat surfaces parallel to the third direction Z. The elements constituting the display device DSPx are the same as those of the display device DSP except for the transparent substrate 30x.

As described with reference to FIG. 4, the light made incident on the transparent substrate 30x from the side surface 30E travels along the first direction X while repeatedly reflected at an interface between the transparent substrate 30x and the air layer and an interface between the transparent substrate 40 and the air layer. FIG. 6 shows propagation of light L2 made incident on the side 30E of the transparent substrate 30x from the same position as that of the lens LN shown in FIG. 4.

An angle formed between the light L1 made incident from the intersection surface 51 and the main surface 30B of the transparent substrate 30 is defined as angle θ3 (shown in FIG. 4), and an angle formed between the light L2 made incident from the side surface 30E and the main surface 30B of the transparent substrate 30x is defined as θ4 (shown in FIG. 5).

In the illumination device 100, the intersection surface 51 of the transparent substrate 30 is inclined in the third direction Z. The light made incident on the transparent substrate 30 is refracted at the intersection surface 51, making the angle θ3 greater than the angle θ4. As the angle θ3 becomes greater, the number of times that the light traveling along the first direction X is reflected increases at the interface between the transparent substrate 30 and the air layer and at the interface between the transparent substrate 40 and the air layer.

Thus, the number of times that the light passes through the liquid crystal layer LC per unit length of the first direction X increases in the display device DSP than in the display device DSPx. From another view point, the energy density of light in the liquid crystal layer LC increases, and thus the light intensity in the liquid crystal layer LC increases. As a result, when the liquid crystal layer LC is in the scattered state, the illumination device 100 can increase the luminance of the display light in the display device DSP more than the luminance of the display light in the display device DSPx.

Next, simulation results will be described. FIG. 7 to FIG. 11 show the simulation results. In the following simulations, the light intensity in the liquid crystal layer LC is simulated by assuming a case where the light is emitted from the light source LS of the illumination device 100. The light intensity may be hereinafter referred to as intensity. In addition, since the displaying is achieved by light in the liquid crystal layer LC being scattered by liquid crystal, the luminance of the display device is considered to be proportional to the light intensity.

The conditions in the simulation are as follows.

The thickness of the transparent substrate 10 is 0.5 mm, the thickness of the transparent substrate 20 is 0.7 mm, the thickness of the transparent substrate 30 is 0.7 mm, the thickness of the transparent substrate 40 is 0.9 mm, and the thickness of each of the adhesive layers AD1 and AD2 is 0.125 mm. The distance from the main surface 40A to the main surface 30B in the display device DSP is 3.05 mm. The thickness of the lens LN is 1.128 mm, the thickness of each of the adhesive layers AD3 and AD4 is 0.205 mm, and the thickness of the reflective material RM2 is 0.75 mm. The refractive index of each of the transparent substrates 10, 20, 30, and 40 is 1.51, and the refractive index of each of the adhesive layers AD1 and AD2 is 1.474.

Figure 7:
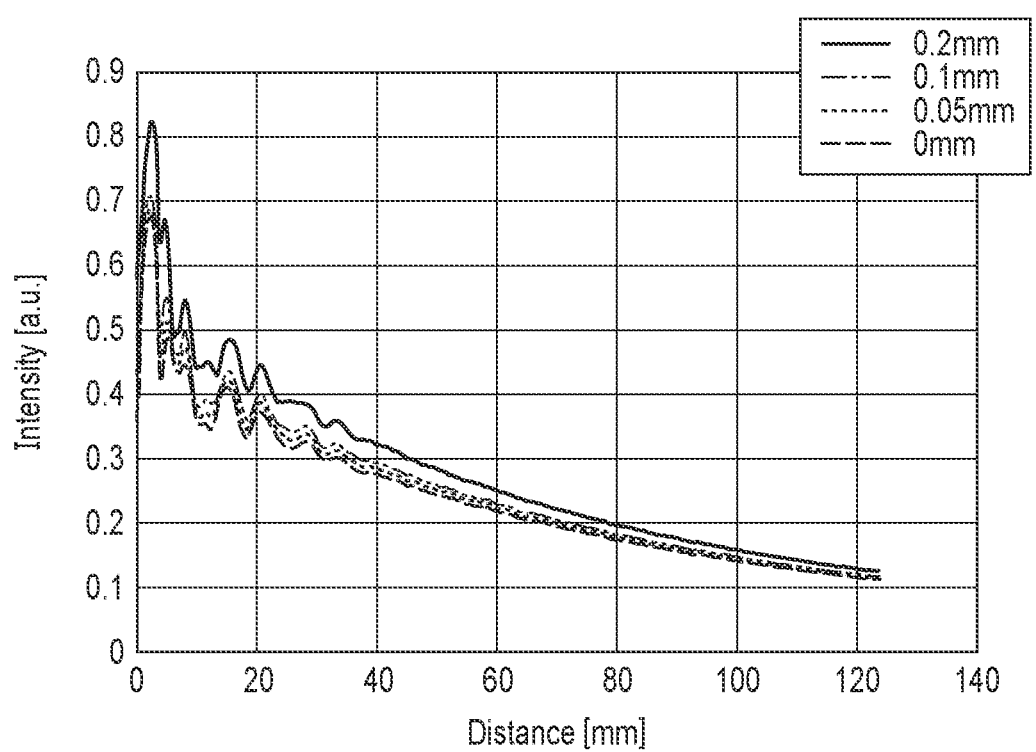
FIG. 7 is a chart showing a simulation result.

FIG. 7 shows the simulation results of the light intensity in the liquid crystal layer LC for four different distances D1 (shown in FIG. 5) of 0 mm, 0.05 mm, 0.1 mm, and 0.2 mm. The angles θ1 and θ2 (shown in FIG. 5) are 45 degrees. Therefore, the distance D2 is substantially equal to the distance D1, and the distance D4 is substantially equal to the distance D3.

In FIG. 7, the horizontal axis shows a distance [mm] from the liquid crystal layer LC, and the vertical axis shows the intensity [a.u.]. The incidence side of the liquid crystal layer LC corresponds to the side surface 30C (side surface E23) side, a side toward which light is emitted from the light source LS. When the distance D1 is 0 mm, the side surface 30C does not have intersection surfaces 51 and 52.

Figure 8:
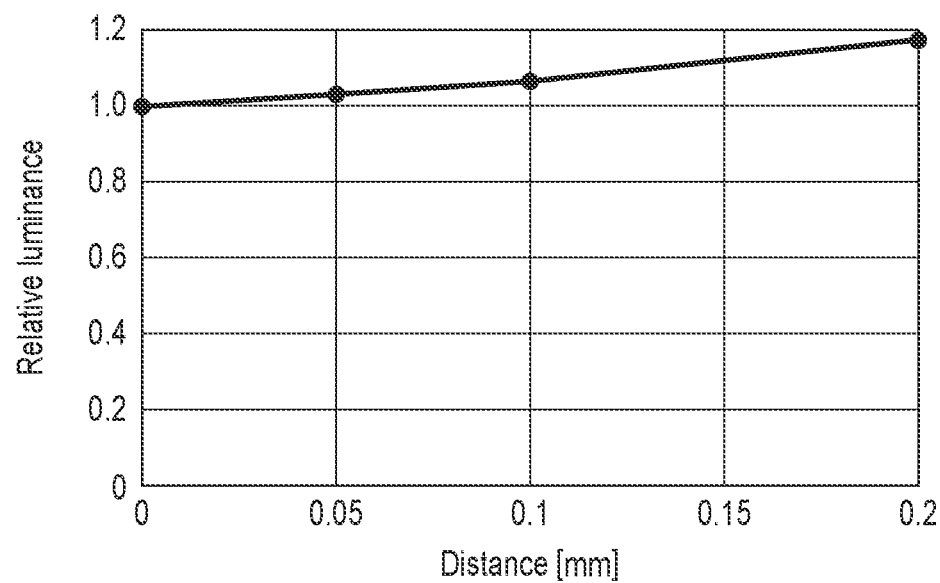
FIG. 8 is a chart showing a simulation result.

FIG. 8 shows the integral luminance based on the simulation results shown in FIG. 7. Based on the total light intensity in the liquid crystal layer LC, the integral luminance is indicated by a relative value with respect to the intensity of the case where the distance D1 is 0 mm (the case where the distance D1 is 0 mm is indicated by 1). The horizontal axis shows the distance D1 [mm] and the vertical axis shows the relative luminance.

As shown in FIG. 7 and FIG. 8, the light intensity increases as the distance D1 increases. As shown in FIG. 7, the increase in the light intensity in association with the increase of the distance D1 is more pronounced in the vicinity of the side surface 30C (incidence side). As shown in FIG. 8, by increasing the distance D1 from 0 mm to 0.2 mm, the integral luminance increases by about 20%.

Figure 9:
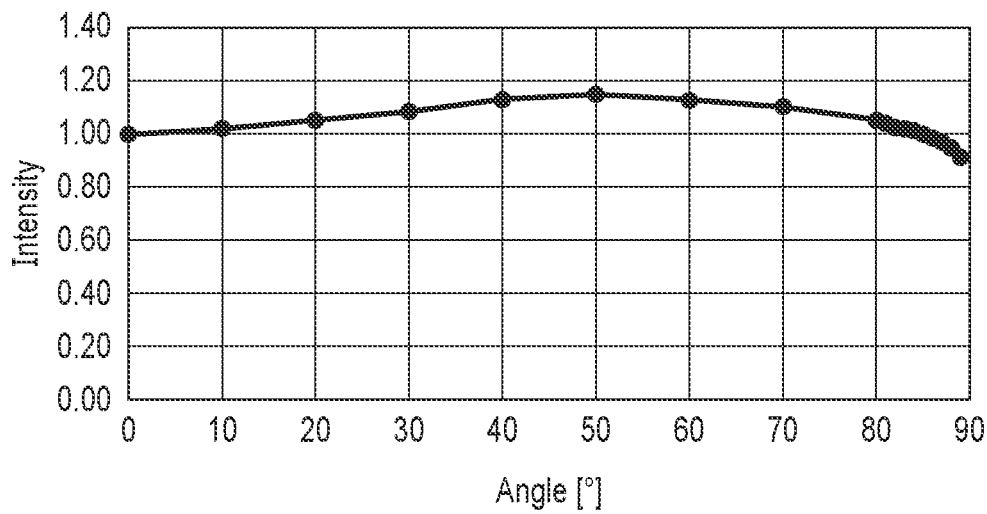
FIG. 9 is a chart showing a simulation result.

FIG. 9 shows the simulation result of the light intensity in the center portion of the liquid crystal layer LC in the first direction X for each of the angle θ1 (shown in FIG. 5). In FIG. 9, the intensity is indicated by a relative value with respect to the intensity of the case where the angle θ1 is 0 degrees (the case where the angle θ1 is 0 degrees is indicated by 1).

Figure 10:
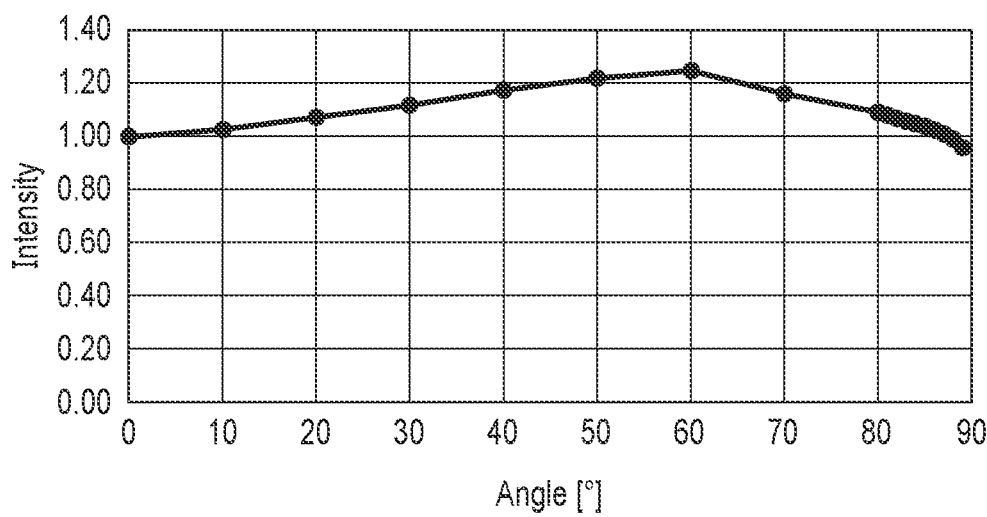
FIG. 10 is a chart showing a simulation result.

FIG. 10 shows the simulation result of the light intensity of the entire liquid crystal layer LC for each of the angle θ1 (shown in FIG. 5). In FIG. 10, the intensity is indicated by a relative value with respect to the intensity of the case where the angle θ1 is 0 degrees (the case where the angle θ1 is 0 degrees is indicated by 1), based on the total light intensity in the entire liquid crystal layer LC.

In FIG. 9 and FIG. 10, the horizontal axes show the angle [°] of θ1, and the vertical axes show the intensity. The angles θ1 are 0, 10, 20, 30, 40, 50, 60, 70, 80, 81, 82, 83, 84, 85, 86, 87, 88, and 89 degrees. The angle θ2 is substantially equal to the angle θ1. When the angle θ1 is 0 degrees, the side surface 30C does not have the intersection surfaces 51 and 52.

FIG. 11 shows the simulation results of the light intensity in the liquid crystal layer LC for five different angles θ1 (shown in FIG. 5) of 0, 50, 80, 85, and 89 degrees. The angle θ2 is substantially equal to the angle θ1. In FIG. 11, the horizontal axis shows a distance [mm] from the liquid crystal layer LC, and the vertical axis shows the intensity [a.u.]. In FIG. 9 to FIG. 11, the distances D1 and D2 (shown in FIG. 5) are 0.2 mm.

As shown in FIG. 9, the light intensity increases as the angle θ1 increases, and the light intensity in the center portion of the liquid crystal layer LC becomes the greatest when the angle θ1 is 50 degrees. The light intensity in the center portion of the liquid crystal layer LC is about 15% greater in the case where the angle θ1 is 50 degrees than that of the case where the angle θ1 is 0 degrees.

As shown in FIG. 10, the light intensity increases as the angle θ1 increases, and the light intensity in the entire liquid crystal layer LC becomes greatest when the angle θ1 is 60 degrees. The light intensity in the entire liquid crystal layer LC is about 25% greater when the angle θ1 is 60 degrees than that of the case where the angle θ1 is 0 degrees. As shown in FIG. 11, the increase in the light intensity is pronounced in the vicinity of the side surface 30C (incidence side) by providing the intersection surfaces 51 and 52.

As shown in FIG. 9 to FIG. 11, when the angle θ1 is greater than 80 degrees, the light intensity may be smaller than when the angle θ1 is 0 degrees. Therefore, the angle θ1 is preferably 80 degrees or less. The angle θ1 is preferably 30 degrees or more and 70 degrees or less, and more preferably 40 degrees or more and 70 degrees or less.

By the intersection surfaces 51 and 52 being inclined in the third direction Z at such an angle, the light intensity in the liquid crystal layer LC can be increased. As a result, when the liquid crystal layer LC is in the scattered state, the luminance of the display light in the display device DSP can be further increased. This range of the angle θ1 can be applied to the angle θ2 in the same manner.

By forming the side surface 30C so as to have the intersection surfaces 51 and 52, a part of the light made incident from the intersection surfaces 51 and 52 does not satisfy the conditions of total reflection at the interface between the transparent substrate 30 and the air layer and the interface between the transparent substrate 40 and the air layer.

Even in such a case, as shown in FIG. 9 to FIG. 11, the light intensity in the liquid crystal layer LC increases since the number of times that light passes through the liquid crystal layer LC per unit length of the first direction X increases by the side surface 30C having the intersection surfaces 51 and 52. As a result, when the liquid crystal layer LC is in the scattered state, the illumination device 100 can increase the luminance of the display light in the display device DSP.

The illumination device 100 and the display device DSP configured as described above can increase the display quality. The illumination device 100 comprises the transparent substrate 30 having the side surface 30C and the plurality of light sources LS emitting light toward the side surface 30C. The side surface 30C has the intersection surfaces 51 and 52 intersecting the third direction Z.

The intersection surfaces 51 and 52 are flat surfaces inclined in the third direction Z. As described with respect to FIG. 4, since the intersection surface 51 is inclined in the third direction Z, the light made incident on the transparent substrate 30 is refracted at the intersection surface 51, making the angle θ3 greater than the angle θ4, compared to the display device DSPx of the comparative example.

As a result, since the number of times that the light traveling along the first direction X is reflected at the interface between the transparent substrate 30 and the air layer and the interface between the transparent substrate 40 and the air layer increases, the number of times that the light passes through the liquid crystal layer LC per unit length of the first direction X can be increased.

From another viewpoint, the illumination device 100 can efficiently utilize the light emitted from the light source LS. As a result, the light intensity in the liquid crystal layer LC increases, and the luminance of the display light in the display device DSP can be increased when the liquid crystal layer LC is in the scattered state.

In transparent displays, the increase of luminance is important from the view point of securing the contrast ratio with the background, the view point of preventing the displayed image from being buried in the background, and the like. Since the illumination device 100 and the display device DSP of the present embodiment can increase the luminance of the display light by utilizing the light emitted from the light source LS, the display quality can be increased.

For example, for increasing the luminance, it is conceivable to increase the power input to the LEDS that are the light source LS. However, from the view of energy saving and heat dissipation design in the display device DSP, it is more preferable to increase the luminance by efficiently utilizing the light from the light source LS rather than increasing the power input.

Since the illumination device 100 and the display device DSP can efficiency utilize the light emitted from the light source LS, the luminance of the display light can be increased without increasing the power input.

The transparent substrate 30 of the present embodiment has the intersection surfaces 51 and 52. Thus, light is made incident on not only the first intersection surface 51 but the intersection surface 52, making an angle formed between the light made incident from the intersection surface 52 and the main surface 40A of the transparent substrate 40 greater than an angle formed between the light made incident from the side surface 30E (shown in FIG. 6) and the main surface 40A of the transparent substrate 40, compared to the display device DSPx of the comparative example.

As a result, the number of times that the light traveling along the first direction X is reflected at the interface between the transparent substrate 30 and the air layer and the interface between the transparent substrate 40 and the air layer can be increased. As a result, the light intensity in the liquid crystal layer LC is further increased.

According to the present embodiment, when the liquid crystal layer LC is in the scattered state, the luminance of the display light in the display device DSP can be further increased. Moreover, the above-described various advantages can be obtained from the present embodiment.

In the present embodiment the angle θ1 and the angle θ2 are substantially equal. However, the angle θ1 may be different from the angle θ2. In the present embodiment, the intersection surfaces 51 and 52 are inclined so as to be spaced apart from each other along the first direction X, but may be inclined so as to be closer to each other along the first direction X. In the present embodiment, the side surface 30C has the parallel surface 53. However, the side surface 30C may not have the parallel surface 53.

Next, another embodiment will be described. In the following another embodiment and modified example, constituent elements identical to those of the first embodiment described above will be designated by the same reference numbers, and detailed descriptions therefor will be omitted or simplified in some cases.

Second Embodiment

The second embodiment will be described. Mainly, the differences from the first embodiment are mentioned here, and the same structure as that of the first embodiment can be applied to each part of the display device DSP according to the present embodiment.

Figure 13:
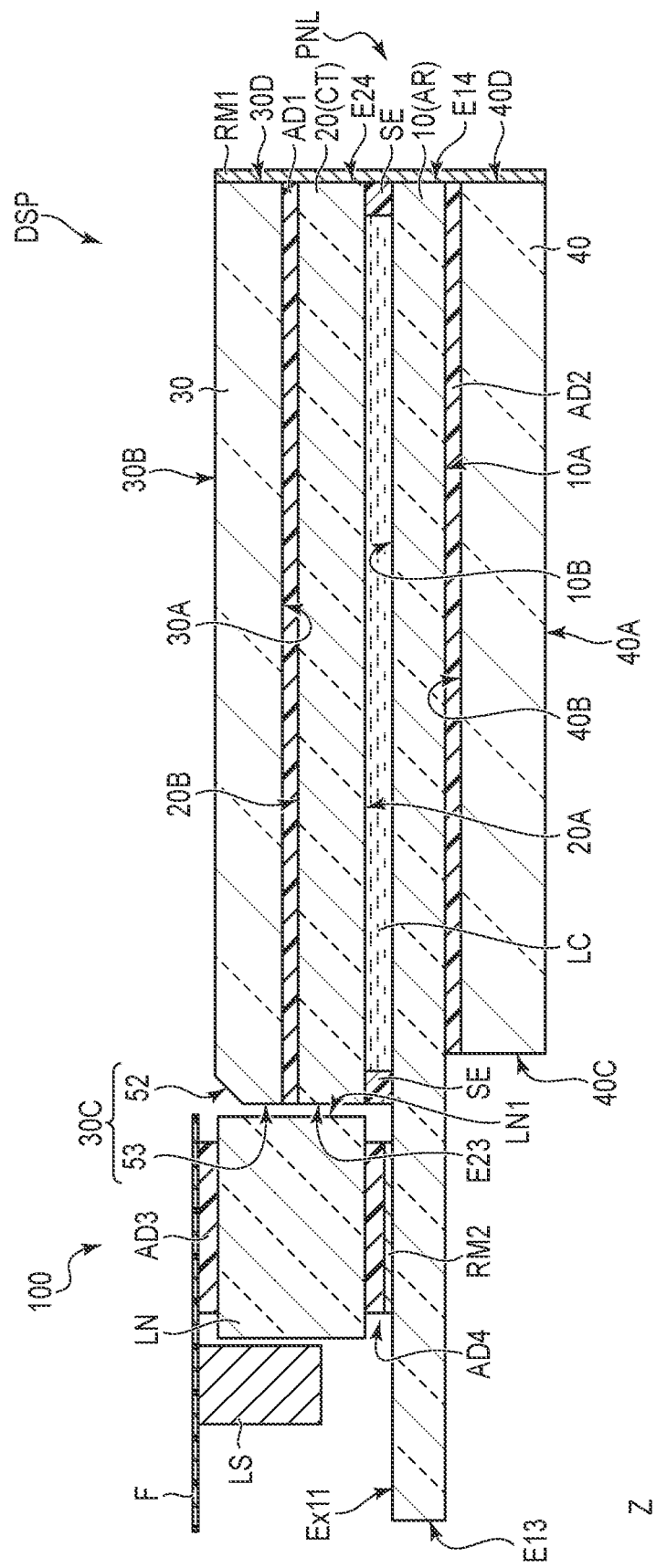
FIG. 13 is a cross-sectional view schematically showing another example of a display device according to the second embodiment.

FIG. 12 and FIG. 13 are cross-sectional views schematically showing a display device DSP according to the present embodiment. In the present embodiment, a side surface 30C of a transparent substrate 30 in an illumination device 100 is different from that of the first embodiment in having one intersection surface.

In the example shown in FIG. 12, the side surface 30C of the transparent substrate 30 has an intersection surface 51 intersecting the third direction Z and a parallel surface 53 parallel to the third direction Z. The intersection surface 51 is connected to a main surface 30A and the parallel surface 53 is connected to the intersection surface 51 and a main surface 30B. In the present embodiment, the intersection surface 51 is a flat surface inclined in the third direction Z.

The intersection surface 51 is inclined so as to become closer to the main surface 30A along the first direction X. From another viewpoint, the distance along the third direction Z between the intersection surface 51 and the main surface 30B increases along the first direction X at a constant rate.

In the example shown in FIG. 13, the side surface 30C of the transparent substrate 30 has an intersection surface 52 intersecting the third direction Z and the parallel surface 53 parallel to the third direction Z. The intersection surface 52 is connected to the main surface 30B, and the parallel surface 53 is connected to the intersection surface 52 and the main surface 30A. In the present embodiment, the intersection surface 52 is a flat surface inclined in the third direction Z.

The intersection surface 52 is inclined so as to become closer to the main surface 30B along the first direction X. From another viewpoint, the distance along the third direction Z between the intersection surface 52 and the main surface 30A increases along the first direction X at a constant rate.

In the present embodiment, each of the intersection surfaces 51 and 52 corresponds to the first intersection surfaces. The same advantages as those of the first embodiment can also be obtained from the configuration of the present embodiment. In the present embodiment, the side surface 30C is formed by the intersection surface 51 and the parallel surface 53 or the intersection surface 52 or the parallel surface 53. However, the side surface 30C may be formed by the intersection surface 51 or the intersection surface 52 alone. In this case, the side surface 30C does not have the parallel surface 53.

Third Embodiment

The third embodiment will be described. Mainly, the differences from the embodiments described above are mentioned here, and the same structures as those of the embodiments described above can be applied to each part of the display device DSP according to the present embodiment.

Figure 14:
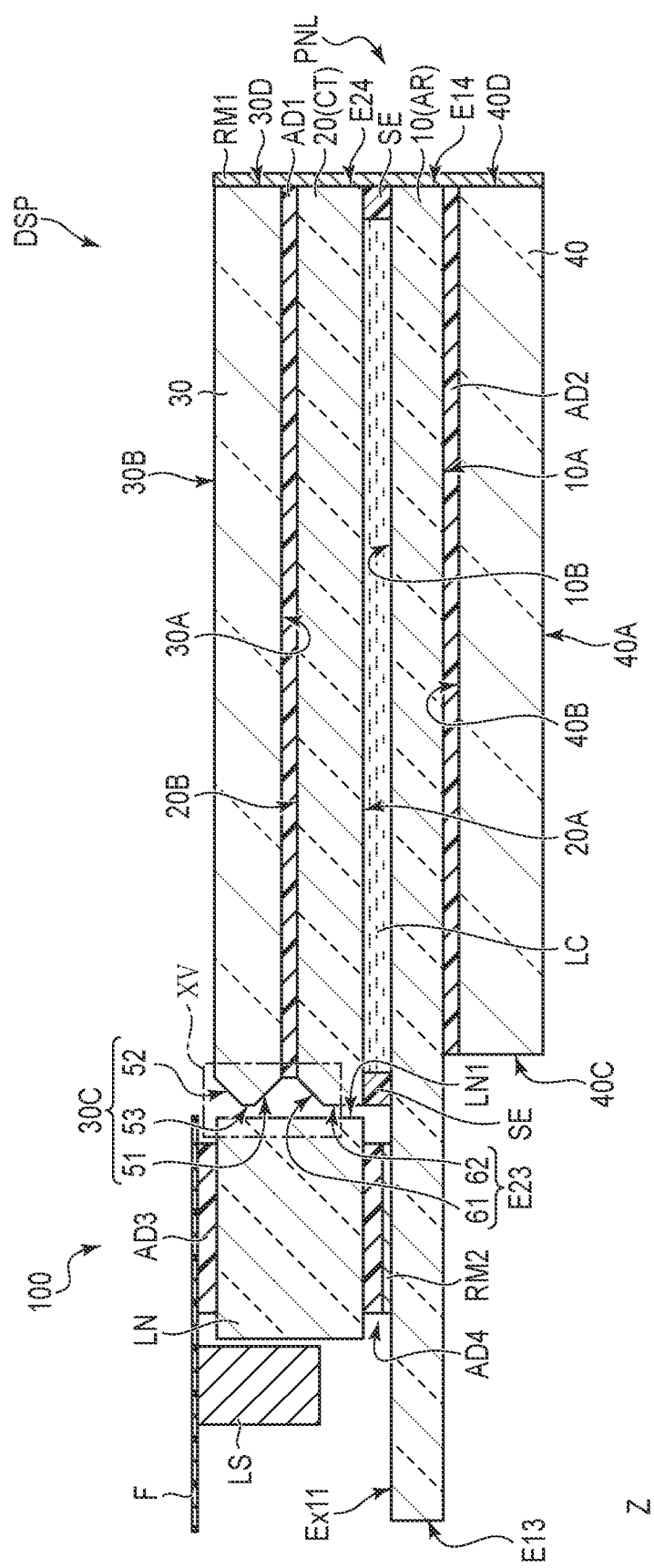
FIG. 14 is a cross-sectional view schematically showing a display device according to a third embodiment.
Figure 15:
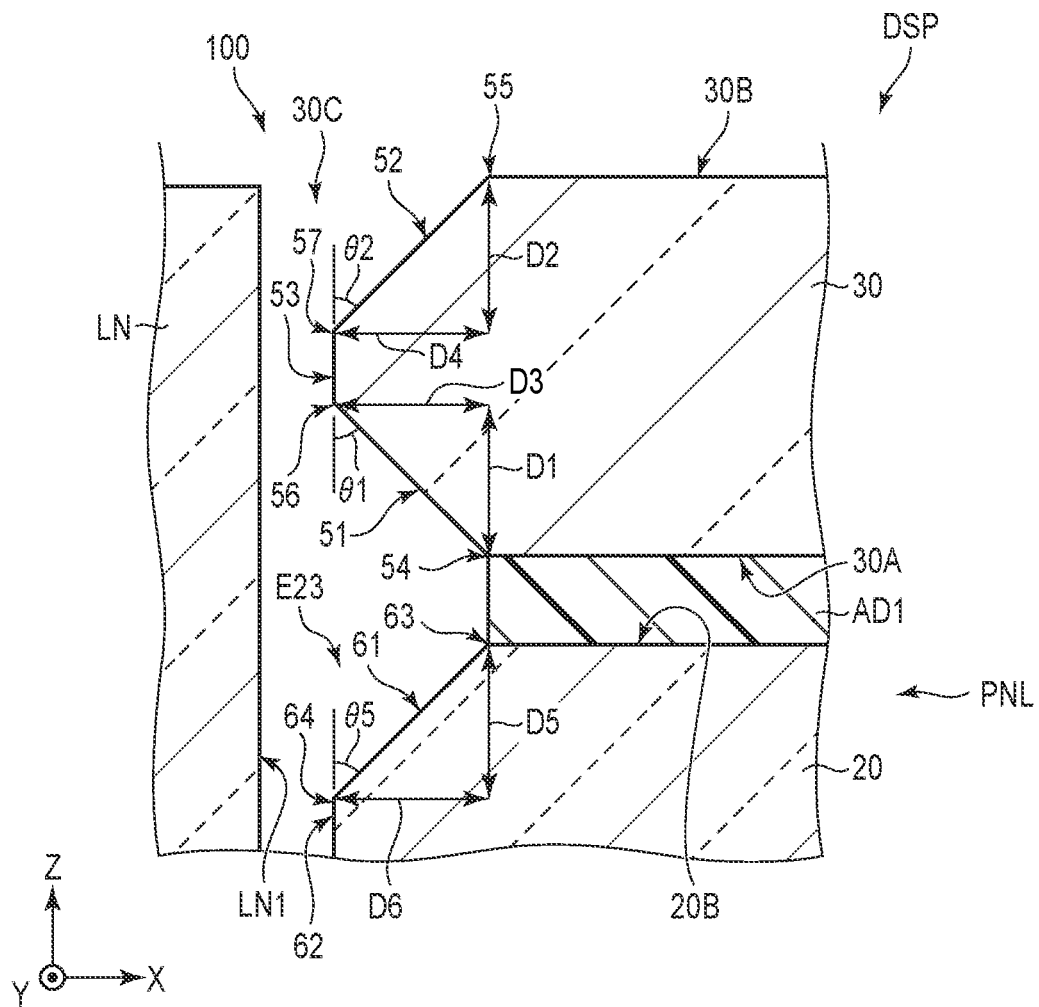
FIG. 15 is a partially enlarged view showing an XV portion shown in FIG. 14.

FIG. 14 is a cross-sectional view schematically showing a display device DSP according to the present embodiment. FIG. 15 is a partially enlarged view showing an XV portion shown in FIG. 14. A transparent substrate 20 in the present embodiment is different from that of the first embodiment in having an intersection surface.

As shown in FIG. 14 and FIG. 15, a side surface 30C has intersection surfaces 51 and 52 intersecting the third direction Z, and a parallel surface 53 parallel to the third direction Z. In the present embodiment, the intersection surface 51 corresponds to the first intersection surface, and the intersection surface 52 corresponds to the second intersection surface.

A side surface E23 of the transparent substrate 20 has an intersection surface 61 intersecting the third direction Z and a parallel surface 62 parallel to the third direction Z. In the present embodiment, the surface E23 corresponds to the second side surface, and the intersection surface 61 corresponds to the third intersection surface.

The intersection surface 61 is connected to a main surface 20B, and the intersection surface 62 is connected to the intersection surface 62 and a main surface 20A. In the present embodiment, the intersection surface 61 is a parallel surface inclined in the third direction Z.

In the third direction Z, the parallel surface 62 is located directly below the parallel surface 53. The transparent substrate 20 further has a side 63 connected to the intersection surface 61 and the main surface 20B and a side 64 connected to the intersection surface 61 and the parallel surface 62. In the example shown in FIG. 15, the side 64 is located closer to a lens LN side than the side 63.

The intersection surface 61 is inclined so as to become closer to the main surface 20B along the first direction X. From another viewpoint, the distance along the third direction Z between the intersection surface 61 and the main surface 20A increases along the first direction X at a constant rate.

As shown in FIG. 14 and FIG. 15, the intersection surface 61 is opposed to the intersection surface 51 in the third direction Z. From another viewpoint, the intersection surfaces 51 and 61 are inclined so as to become closer to each other along the first direction X. The distance along the third direction Z between the intersection surfaces 51 and 61 decreases along the first direction X at a constant rate.

Viewed in the direction opposite to the second direction Y, an acute angle formed between the third direction Z and the intersection surface 61 is defined as angle $\theta 5$ (shown in FIG. 15). From another viewpoint, the angle $\theta 5$ corresponds to an acute angle formed between the intersection surface 61 and the Y-Z plane. In the example shown in FIG. 15, the angle $\theta 5$ is constant in the second direction Y.

In the present embodiment, the angle $\theta 5$ is substantially equal to the angle $\theta 1$ ($\theta 5=\theta 1$). For example, the size of the intersection surface 61 is substantially equal to the size of the intersection surface 51. From another viewpoint, a distance D5 along the third direction Z between the side 63 and the side 64 is substantially equal to a distance D1 along the third direction Z between a side 54 and a side 56. A distance D6 along the first direction X between the side 63 and the side 64 is substantially equal to a distance D3 along the first direction X between the side 54 and the side 56.

Incidentally, the angle $\theta 5$ may be greater or smaller than the angle $\theta 1$. The light emitted from a light source LS is made incident on a transparent substrate 30 from the intersection surfaces 51 and 52 and the parallel surface 53 and is made incident on the transparent substrate 20 from the intersection surface 61 and the parallel surface 62.

Figure 18:
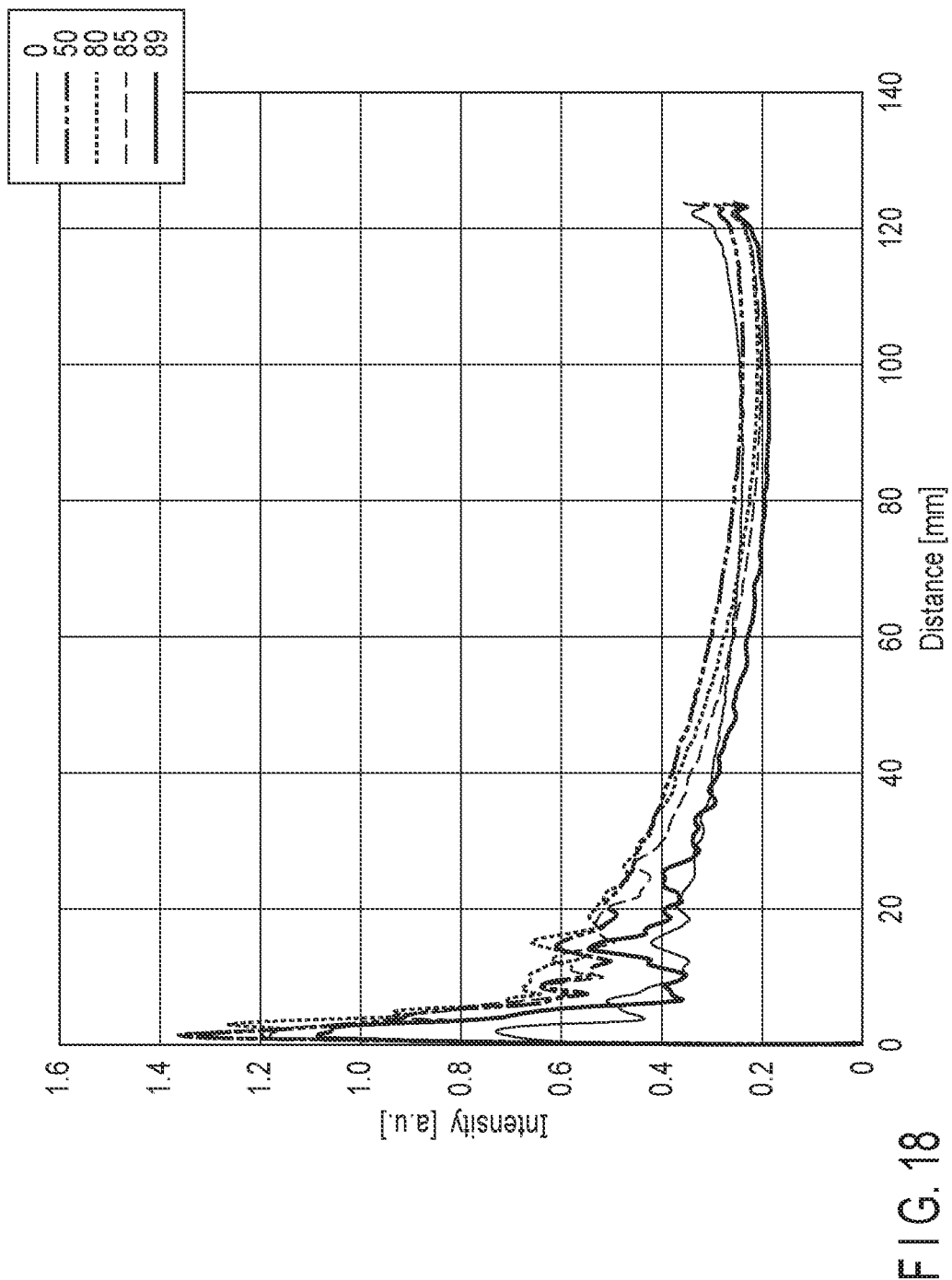
FIG. 18 is a chart showing a simulation result.

Next, simulation results will be described. FIG. 16 to FIG. 18 show the simulation results. In the following simulations, the constituent elements other than the transparent substrate 20 are the same as the elements constituting the display device DSP described in the first embodiment.

FIG. 16 shows the simulation result of the light intensity in the center portion of the liquid crystal layer LC in the first direction X for each of the angle $\theta 1$ (shown in FIG. 15). In FIG. 16, the intensity is indicated by a relative value with respect to the intensity of the case where the angle $\theta 1$ is 0 degrees (the case where the angle $\theta 1$ is 0 degrees is indicated by 1).

FIG. 17 shows the simulation result of the light intensity of the entire liquid crystal layer LC for each of the angle $\theta 1$ (shown in FIG. 15). In FIG. 17, the intensity is indicated by a relative value with respect to the intensity of the case where the angle $\theta 1$ is 0 degrees (the case where the angel $\theta 1$ is 0 degrees is indicated by 1), based on the total light intensity in the entire liquid crystal layer LC.

In FIG. 16 and FIG. 17, the horizontal axes show the angle [°] of the angle $\theta 1$, and the vertical axes show the intensity. The angles $\theta 1$ are 0, 10, 20, 30, 40, 50, 60, 70, 80, 81, 82, 83, 84, 85, 86, 87, 88, and 89 degrees. The angle $\theta 2$ is substantially equal to the angle $\theta 1$, and the angle $\theta 5$ is substantially equal to the angle $\theta 1$.

FIG. 18 shows the simulation results of the light intensity in the liquid crystal layer LC for five different angles $\theta 1$ (shown in FIG. 5) of 0, 50, 80, 85, and 89 degrees. The angle $\theta 2$ is substantially equal to the angle $\theta 1$, and the angle $\theta 5$ is substantially equal to the angle θ1. In FIG. 18, the horizontal axis shows a distance [mm] from the liquid crystal layer LC, and the vertical axis shows the intensity [a.u.]. Incidentally, in FIG. 16 to FIG. 18, each of the distances D1, D2, and D5 (shown in FIG. 15) is 0.2 mm.

As shown in FIG. 16, the light intensity increases as the angle θ1 increases, and the light intensity in the center portion of the liquid crystal layer LC becomes the greatest when the angle θ1 is 50 degrees. The light intensity in the center portion of the liquid crystal layer LC is about 15% greater in the case where the angle θ1 is 50 degrees than that of the case where the angle θ1 is 0 degrees.

As shown in FIG. 17, the light intensity increases as the angle θ1 increases, and the light intensity in the entire liquid crystal layer LC becomes the greatest when the angle θ1 is 70 degrees. The light intensity of the entire liquid crystal layer LC is about 27% greater in the case where the angle θ1 is 70 degrees than that of the case where the angle θ1 is 0 degrees. As shown in FIG. 18, the increase in the light intensity is pronounced in the vicinity of the side surface 30C (incidence side) by providing the intersection surfaces 51, 52, and 61.

As shown in FIG. 16 to FIG. 18, when the angle θ1 is greater than 80 degrees, the light intensity may be smaller than the case where the angle θ1 is 0 degrees. Therefore, the angle θ1 is preferably 80 degrees or less. The angle θ1 is preferably 30 degrees or more and 70 degrees or less, and more preferably 40 degrees or more and 70 degrees or less. This range of the angle θ1 can be applied to the angles θ2 and θ5 in the same manner.

The same advantages as those of the first embodiment can also be obtained from the configuration of the present embodiment. Since the main surface 20B is substantially parallel to the X-Y plane, a part of the light made incident on the transparent substrate 20 from the lens LN through the main surface 20B does not satisfy the conditions of total reflection at an interface between the transparent substrate 40 and an air layer.

In the present embodiment, the side surface E23 of the transparent substrate 20 has the intersection surface 61. The light made incident on the transparent substrate 20 is refracted at the intersection surface 61, satisfying the conditions of total reflection at the interface between the transparent substrate 40 and the air layer. Thus, the light made incident on the transparent substrate 20 from the intersection surface 61 is reflected at the interface between the transparent substrate 40 and the air layer.

As a result, by forming the intersection surface 61 on the side surface E23, the light emitted from the light source LS of an illumination device 100 can be utilized more efficiently, and the number of times that the light passes through the liquid crystal layer LC per unit length of the first direction X increases.

Therefore, the light intensity in the liquid crystal layer LC increases, and the luminance of the display light in the display device DSP can be further increased when the liquid crystal layer LC is in the scattered state. In other words, in the present embodiment, the display quality can be further increased. In the present embodiment, the angle θ1, the angle θ2, and the angle θ5 are substantially equal to one another. However, the angle θ1, the angle θ2, and the angle θ5 may be different from one another.

Fourth Embodiment

The fourth embodiment will be described. Mainly, the differences from the embodiments described above are mentioned here, and the same structures as those of the embodiments described above can be applied to each part of the display device DSP according to the present embodiment.

FIG. 19 is a cross-sectional view schematically showing a display device DSP according to the present embodiment. A transparent substrate 20 in the present embodiment is different from that of the second embodiment in having an intersection surface.

The transparent substrate 20 of the present embodiment has the same shape as the transparent substrate 20 of the third embodiment. More specifically, a side surface E23 of the transparent substrate 20 has an intersection surface 61 intersecting the third direction Z and a parallel surface 62 parallel to the third direction Z. In the present embodiment, an intersection surface 51 corresponds to the first intersection surface, the side surface E23 corresponds to the second side surface, and the intersection surface 61 corresponds to the third intersection surface.

The configuration of the present embodiment is the combination of the configuration of the second embodiment described with reference to FIG. 12 and the configuration of the third embodiment. The same advantages as those of the embodiments described above can also be obtained from the configuration of the present embodiment.

Fifth Embodiment

The fifth embodiment will be described. Mainly, the differences from the embodiments described above are mentioned here, and the same structures as those of the embodiments described above can be applied to each part of the display device DSP according to the present embodiment.

Figure 20:
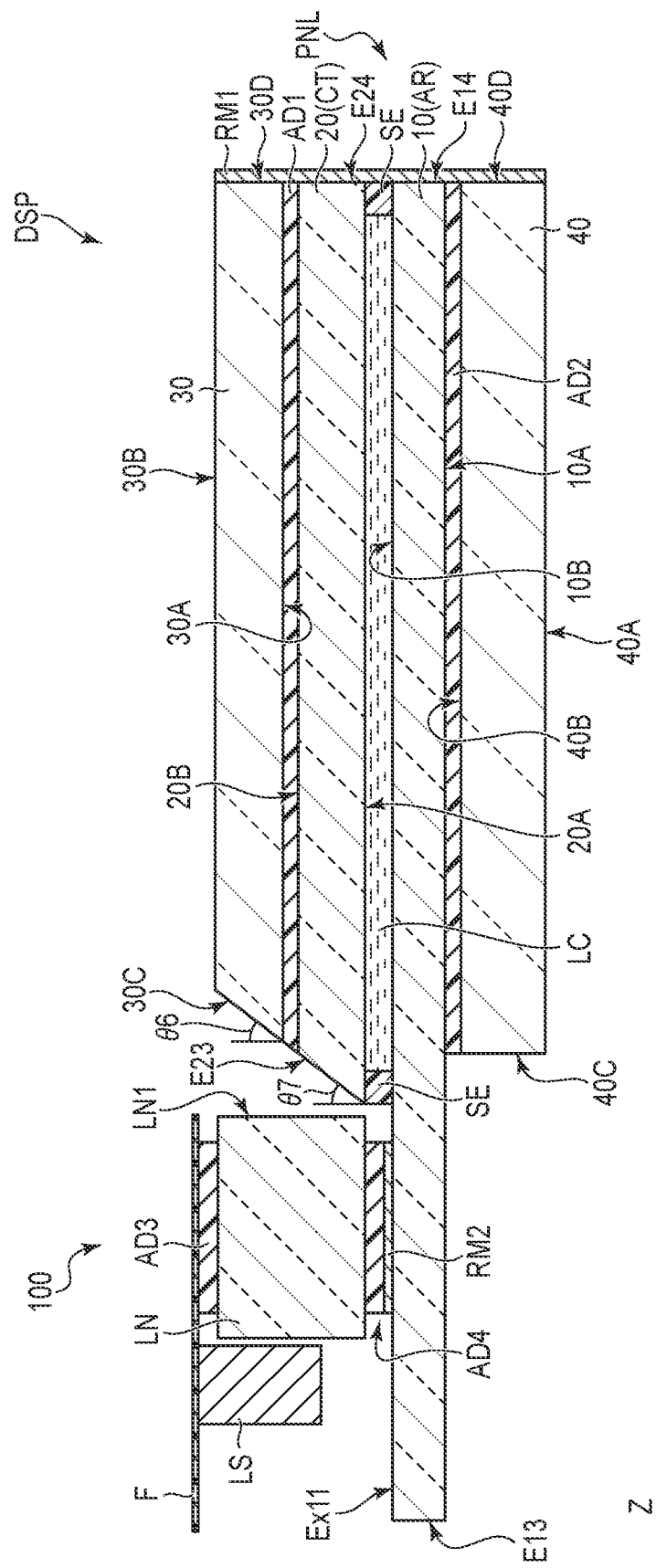
FIG. 20 is a cross-sectional view schematically showing a display device according to a fifth embodiment.

FIG. 20 is a cross-sectional view schematically showing a display device DSP according to the present embodiment. A side surface 30C of a transparent substrate 30 in an illumination device 100 is a flat surface inclined in the third direction Z. From another view point, the side surface 30C is a flat surface inclined with respect to the Y-Z plane. In the present embodiment, the side surface 30C corresponds to the first intersection surface. The side surface 30C is connected to a main surface 30A and a main surface 30B.

The side surface 30C is inclined so as to be spaced apart from the main surface 30A along the first direction X. From another viewpoint, the distance along the third direction Z between the side surface 30C and the main surface 30A increases along the first direction X at a constant rate. A lower end of the side surface 30C (end portion of the main surface 30A side) protrudes relative to an upper end (end portion of the main surface 30B side) in the direction opposite to the first direction X.

A side surface E23 of the transparent substrate 20 is a flat surface inclined in the third direction Z. From another view point, the side surface E23 is a flat surface inclined with respect to the Y-Z plane. In the present embodiment, the side surface E23 corresponds to the third intersection surface.

The side surface E23 is inclined so as to be spaced apart from the main surface 20A along the first direction X. From another viewpoint, the distance along the third direction Z between the side surface E23 and a main surface 20A increases along the first direction X at a constant rate. A lower end of the side surface E23 (end portion of the main surface 20A side) protrudes relative to an upper end (end portion of the main surface 20B side) in the direction opposite to the first direction X.

Viewed in the direction opposite to the second direction Y, an acute angle formed between the third direction Z and the side surface 30C is defined as angle θ6, and an acute angle formed between the third direction Z and the side surface E23 is defined as angle θ7. From another view point, the angle θ6 corresponds to an acute angle formed between the side surface 30C and the Y-Z plane, and the angle θ7 corresponds to an acute angle formed between the side surface E23 and the Y-Z plane. An angle formed between the side surface 30C and the main surface 30A is an acute angle, and an angle formed between the side surface E23 and the main surface 20A is an acute angle.

The angles θ6 and θ7 are constant in the second direction Y. In the present embodiment, the angle θ6 is substantially equal to the angle θ7. The side surface E23 is substantially located on the same flat surface as the side surface 30C. In the example shown in FIG. 20, the side surface E23 is located closer to the light source LS than the side surface 30C.

Figure 23:
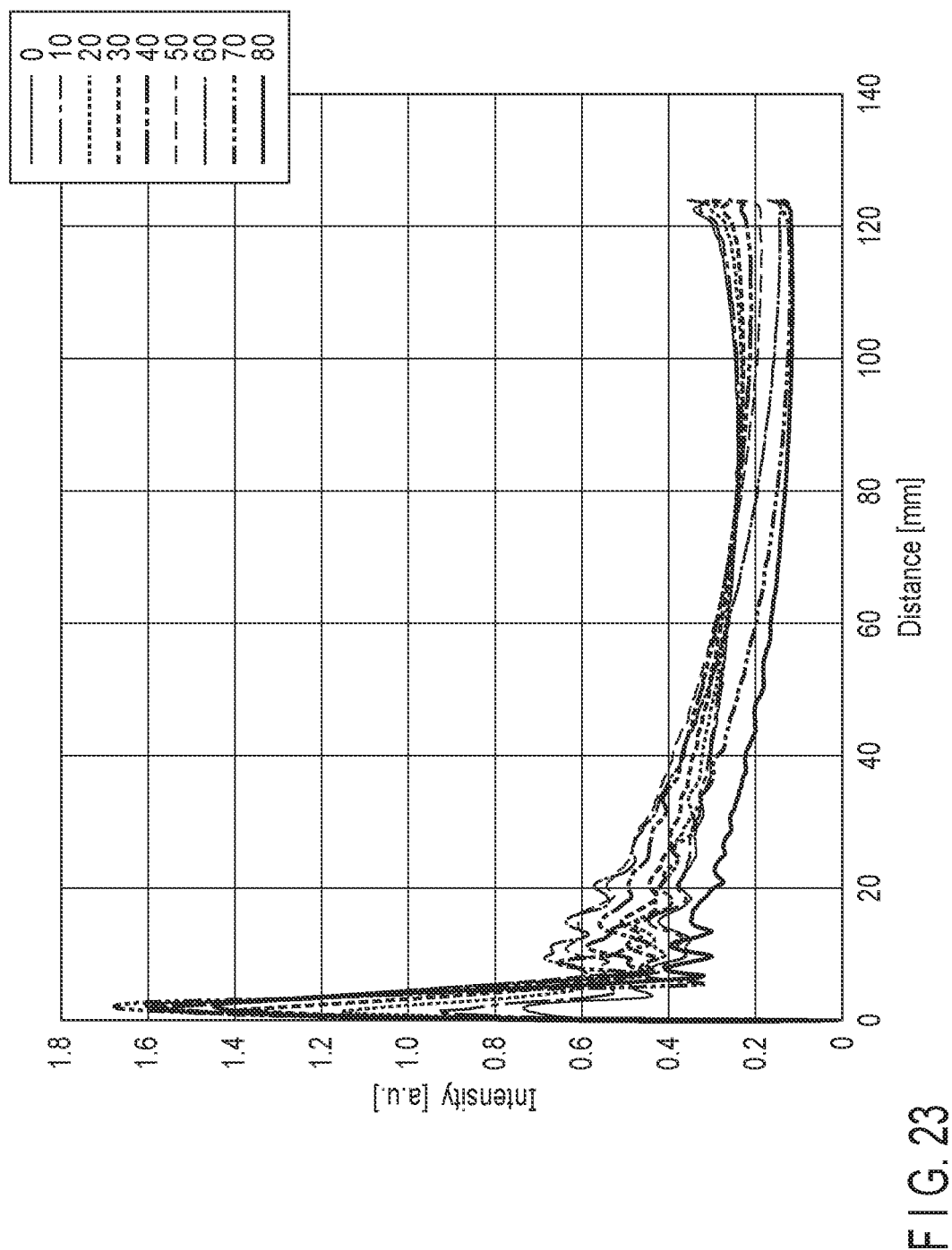
FIG. 23 is a chart showing a simulation result.

Next, simulation results will be described. FIG. 21 to FIG. 23 show the simulation results. In the following simulations, the constituent elements other than the transparent substrates 20 and 30 are the same as the elements constituting the display device DSP described in the first embodiment.

FIG. 21 shows the simulation result of the light intensity in the center portion of the liquid crystal layer LC in the first direction X for each of the angle θ6 (shown in FIG. 20). In FIG. 20, the intensity is indicated by a relative value with respect to the intensity of the case where the angle θ6 is 0 degrees (the case where the angle θ6 is 0 degrees is indicated by 1).

FIG. 22 shows the simulation result of the light intensity of the entire liquid crystal layer LC for each of the angle θ6 (shown in FIG. 20). In FIG. 22, the intensity is indicated by a relative value with respect to the intensity of the case where the angle θ6 is 0 degrees (the case where the angel θ6 is 0 degrees is indicated by 1), based on the total light intensity in the entire liquid crystal layer LC.

In FIG. 21 and FIG. 22, the horizontal axes show the angle [°] of θ6, and the vertical axes show the intensity. The angles θ6 are 0, 10, 20, 30, 40, 50, 60, 70, and 80 degrees. The angle θ7 is substantially equal to the angle θ6. When the angle θ6 is 0 degrees, the side surface 30C is parallel to the third direction Z.

FIG. 23 shows the simulation results of the light intensity in the liquid crystal layer LC for nine different angles θ6 (shown in FIG. 20) of 0, 10, 20, 30, 40, 50, 60, 70, and 80 degrees. The angle θ7 is substantially equal to the angle θ6. In FIG. 23, the horizontal axis shows a distance [mm] from the liquid crystal layer LC, and the vertical axis shows the intensity [a.u.].

As shown in FIG. 21, the light intensity increases as the angle θ6 increases, and the light intensity in the center portion of the liquid crystal layer LC becomes the greatest when the angle θ6 is 50 degrees. The light intensity in the center portion of the liquid crystal layer LC is about 9% greater in the case where the angle θ6 is 50 degrees than that of the case where the angle θ6 is 0 degrees.

As shown in FIG. 22, the light intensity increases as the angle θ6 increases, and the light intensity in the entire liquid crystal layer LC becomes the greatest when the angle θ6 is 50 degrees. The light intensity of the entire liquid crystal layer LC is about 20% greater in the case where the angle θ6 is 50 degrees than that of the case where the angle θ6 is 0 degrees.

As shown in FIG. 23, in the vicinity of the side surface 30C (incidence side), the light intensity tends to increase as the angle θ6 increases. As shown in FIG. 21 to FIG. 23, when the angle θ6 is greater than 60 degrees, the light intensity may be smaller than the case where the angle θ6 is 0 degrees. Therefore, the angle θ6 is preferably 60 degrees or less. The angle θ6 is preferably 30 degrees or more and 60 degrees or less, and more preferably 40 degrees or more and 60 degrees or less. This range of the angle θ6 can be applied to the angle θ7 in the same manner.

The same advantages as those of the embodiments described above can also be obtained from the configuration of the present embodiment. In the present embodiment, the light emitted from the light source LS can be utilized more efficiently by the light made incident on the transparent substrate 30 being refracted at the side surface 30C, which is an inclined flat surface, and the light made incident on the transparent substrate 20 being refracted at the side surface E23, which is an inclined flat surface. The angle θ7 may be different from the angle θ6.

Sixth Embodiment

The sixth embodiment will be explained. Mainly, the differences from the embodiments described above are mentioned here, and the same structures as those of the embodiments described above can be applied to each part of the display device DSP according to the present embodiment.

Figure 24:
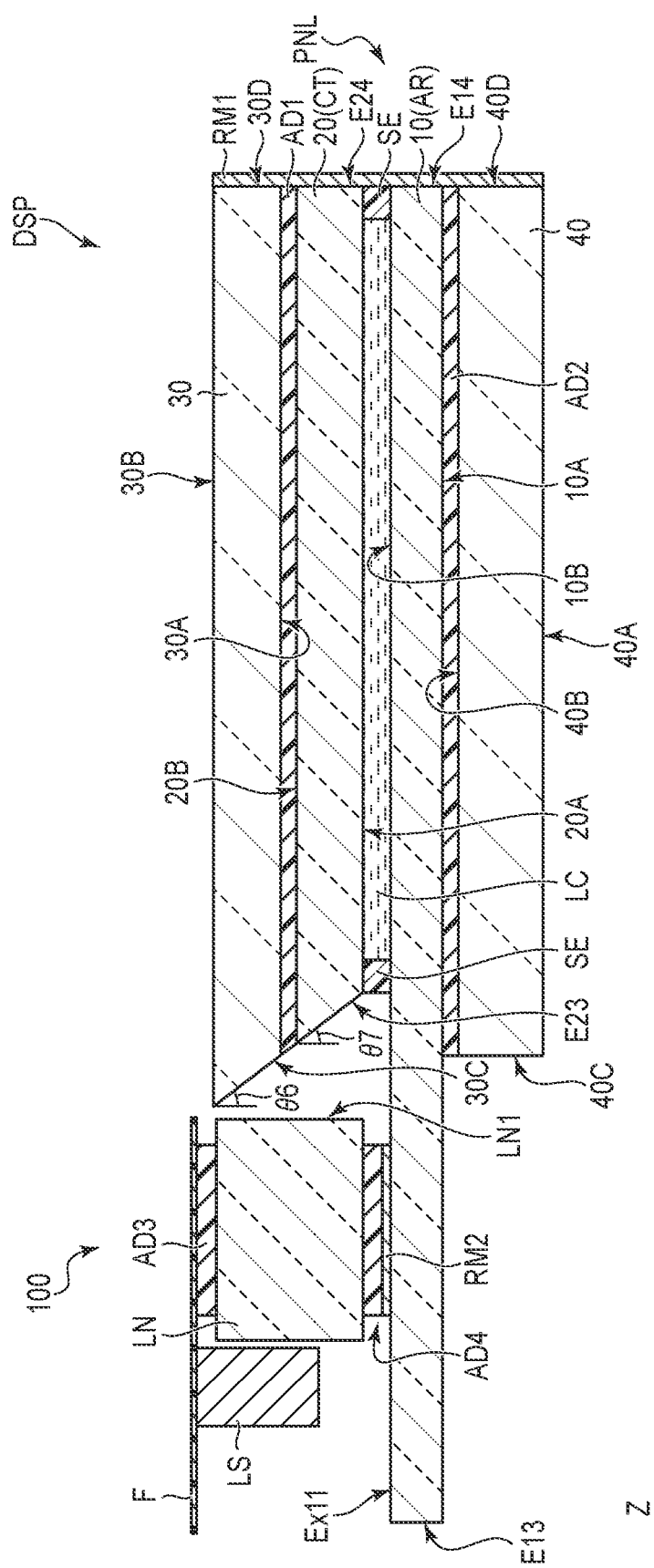
FIG. 24 is a cross-sectional view schematically showing a display device according to a sixth embodiment.

FIG. 24 is a cross-sectional view schematically showing a display device DSP according to the present embodiment. Transparent substrates 20 and 30 in the present embodiment are different from those of the fifth embodiment in the directions of the inclination of a side surface 30C and a side surface E23.

The side surface 30C of the transparent substrate 30 in an illumination device 100 is a flat surface inclined in the third direction Z. From another view point, the side surface 30C is a flat surface inclined with respect to the Y-Z plane. In the present embodiment, the side surface 30C corresponds to the first intersection surface.

The side surface 30C is inclined so as to be spaced apart from a main surface 30B along the first direction X. From another viewpoint, the distance along the third direction Z between the side surface 30C and the main surface 30B increases along the first direction X at a constant rate. An upper end of the side surface 30C (end portion of the main surface 30B side) protrudes relative to a lower end (end portion of the main surface 30A side) in the direction opposite to the first direction X.

A side surface E23 of the transparent substrate 20 is a flat surface inclined in the third direction Z. From another view point, the side surface E23 is a flat surface inclined with respect to the Y-Z plane. In the present embodiment, the side surface E23 corresponds to the third intersection surface. The side surface E23 is connected to the main surface 20A and the main surface 20B.

The side surface E23 is inclined so as to be spaced apart from the main surface 20B along the first direction X. From another viewpoint, the distance along the third direction Z between the side surface E23 and the main surface 20B increases along the first direction X at a constant rate. An upper end of the side surface E23 (end portion of the main surface 20B side) protrudes relative to a lower end (end portion of the main surface 20A side) in the direction opposite to the first direction X.

An angle formed between the side surface 30C and the main surface 30B is an acute angle, and an angle formed between the side surface E23 and the main surface 20B is an acute angle. The angles θ6 and θ7 are constant in the second direction Y. In the present embodiment, the angle θ6 is substantially equal to the angle θ7. The side surface E23 is substantially located on the same flat surface as the side surface 30C. In the example shown in FIG. 24, the side surface 30C is located closer to a light source LS than the side surface E23.

Figure 25:
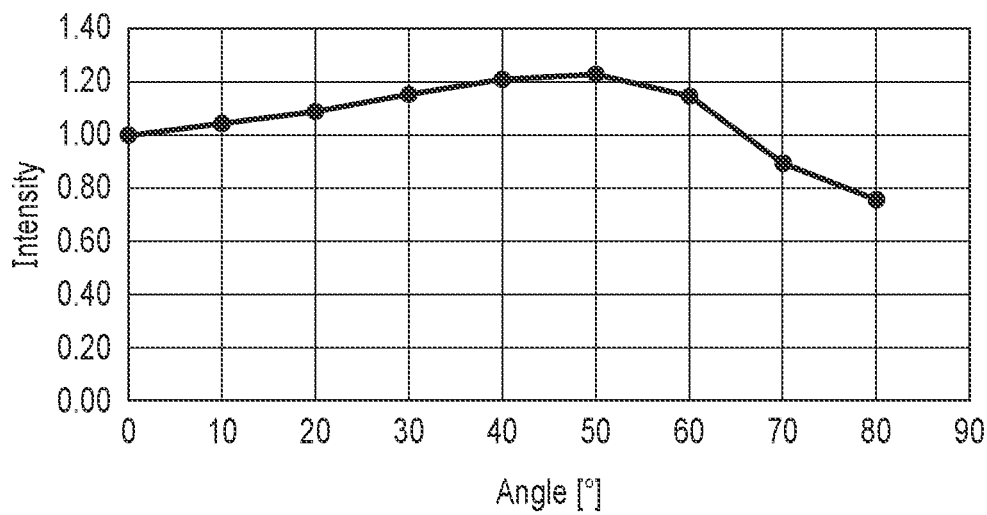
FIG. 25 is a chart showing a simulation result.
Figure 26:
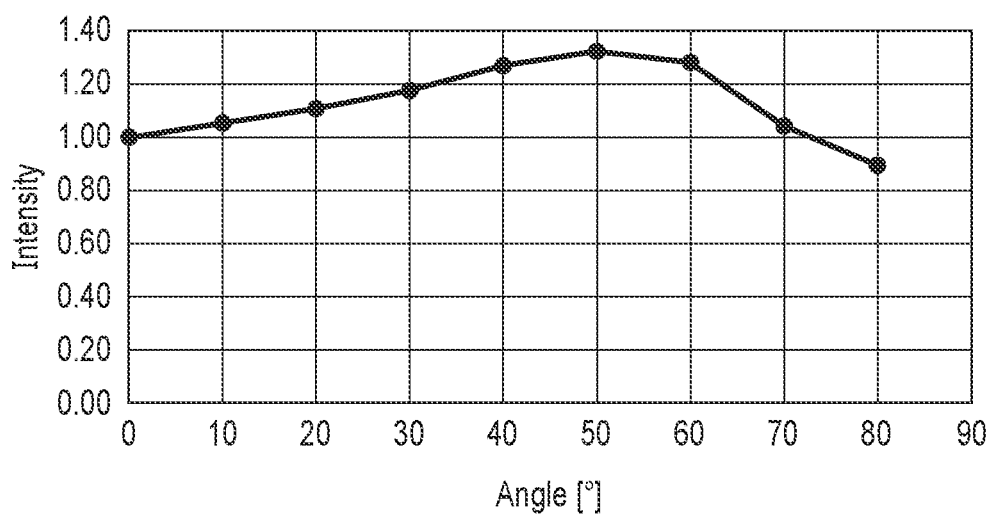
FIG. 26 is a chart showing a simulation result.
Figure 27:
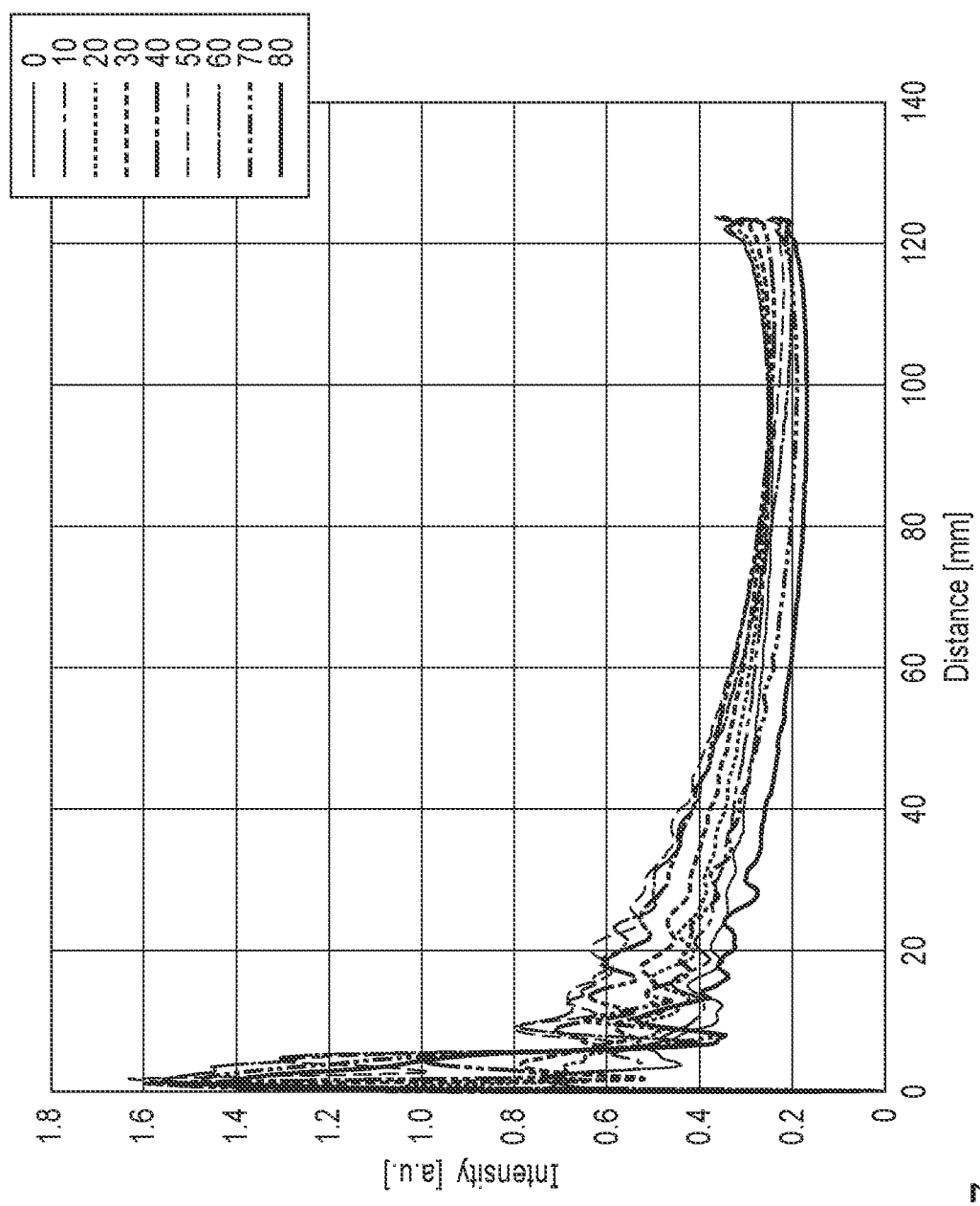
FIG. 27 is a chart showing a simulation result.

Next, simulation results will be described. FIG. 25 to FIG. 27 show the simulation results. In the following simulations, the constituent elements other than the transparent substrates 20 and 30 are the same as the elements constituting the display device DSP described in the first embodiment.

FIG. 25 shows the simulation result of the light intensity in the center portion of a liquid crystal layer LC in the first direction X for each of the angle θ6 (shown in FIG. 24). In FIG. 25, the intensity is indicated by a relative value with respect to the intensity of the case where the angle θ6 is 0 degrees (the case where the angle θ6 is 0 degrees is indicated by 1).

FIG. 26 shows the simulation result of the light intensity of the entire liquid crystal layer LC for each of the angle θ6 (shown in FIG. 24). In FIG. 26, the intensity is indicated by a relative value with respect to the intensity of the case where the angle θ6 is 0 degrees (the case where the angel θ6 is 0 degrees is indicated by 1), based on the total light intensity in the entire liquid crystal layer LC.

In FIG. 25 and FIG. 26, the horizontal axes show the angle [°] of θ6, and the vertical axes show the intensity. The angles are 0, 10, 20, 30, 40, 50, 60, and 70 degrees. The angle θ7 is substantially equal to the angle θ6.

FIG. 27 shows the simulation results of the light intensity in the liquid crystal layer LC for nine different angles θ6 (shown in FIG. 24) of 0, 10, 20, 30, 40, 50, 60, 70, and 80 degrees. The angle θ7 is substantially equal to the angle θ6. In FIG. 27, the horizontal axis shows a distance [mm] from the liquid crystal layer LC, and the vertical axis shows the intensity [a.u.].

As shown in FIG. 25, the light intensity increases as the angle θ6 increases, and the light intensity in the center portion of the liquid crystal layer LC becomes the greatest when the angle θ6 is 50 degrees. The light intensity in the center portion of the liquid crystal layer LC is about 23% greater in the case where the angle θ6 is 50 degrees than that of the case where the angle θ6 is 0 degrees.

As shown in FIG. 26, the light intensity increases as the angle θ6 increases, and the light intensity in the entire liquid crystal layer LC becomes the greatest when the angle θ6 is 50 degrees. The light intensity of the entire liquid crystal layer LC is about 33% greater in the case where the angle θ6 is 50 degrees than that of the case where the angle θ6 is 0 degrees.

As shown in FIG. 27, in the vicinity of the side surface 30C (incidence side), the light intensity tends to increase as the angle θ6 increases. As shown in FIG. 25 to FIG. 27, when the angle θ6 is greater than 60 degrees, the light intensity may be smaller than the case where the angle θ6 is 0 degrees.

Therefore, the angle θ6 is preferably 60 degrees or less. The angle θ6 is preferably 30 degrees or more and 60 degrees or less, and more preferably 40 degrees or more and 60 degrees or less. This range of the angle θ6 can be applied to the angle θ7 in the same manner.

The same advantages as those of the embodiments described above can also be obtained from the configuration of the present embodiment. The angle θ7 may be different from the angle θ6.

Seventh Embodiment

The seventh embodiment will be described. Mainly, the differences from the embodiments described above are mentioned here, and the same structures as those of the embodiments described above can be applied to each part of the display device DSP according to the present embodiment.

Figure 28:
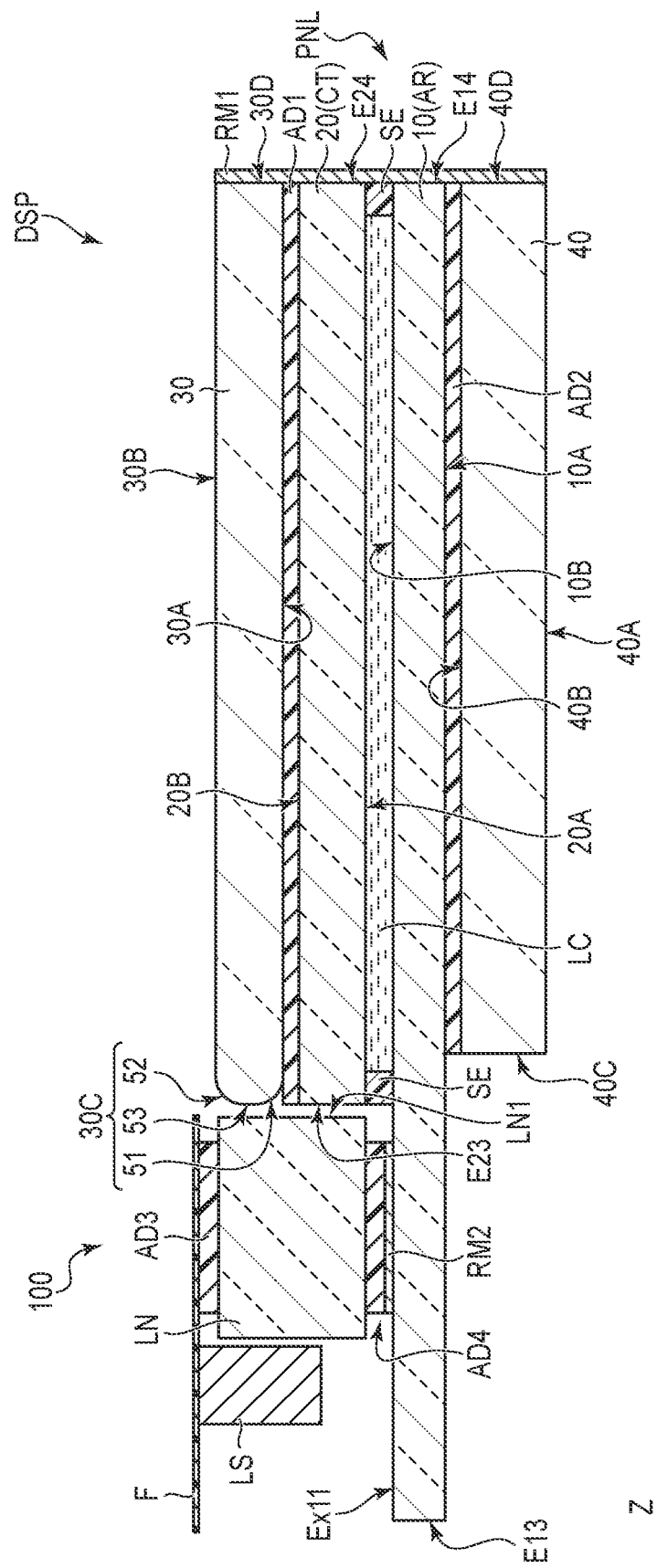
FIG. 28 is a cross-sectional view schematically showing a display device according to a seventh embodiment.

FIG. 28 is a cross-sectional view schematically showing a display device DSP according to the present embodiment. In the present embodiment, an intersection surface included in a side surface 30C of a transparent substrate 30 in an illumination device 100 is different from that of the first embodiment in being a curved surface.

The side surface 30C has intersection surfaces 51 and 52 intersecting the third direction Z, and a parallel surface 53 parallel to the third direction Z. In the present embodiment, the intersection surface 51 corresponds to the first intersection surface, and the intersection surface 52 corresponds to the second intersection surface. The intersection surface 51 is connected to a main surface 30A, the intersection surface 52 is connected to a main surface 30B, and the parallel surface 53 is connected to the intersection surface 51 and the intersection surface 52.

In the present embodiment, the intersection surfaces 51 and 52 are curved surfaces. In the example shown in FIG. 28, the intersection surfaces 51 and 52 are formed into protruding curved surfaces extending toward a light source LS. The distance along the third direction Z between the intersection surface 51 and the intersection surface 52 increases along the first direction X. However, the intersection surfaces 51 and 52 may be formed into convex curved surfaces.

Since the intersection surfaces 51 and 52 intersect the third direction Z in the present embodiment as well, the same advantages as those of the embodiments described above can also be obtained from the configuration of the present embodiment. In the present embodiment, the side surface 30C has the intersection surface 51 and the intersection surface 52. However, it suffices when the side surface 30C has at least one of the intersection surface 51 and the intersection surface 52. The side surface 30C has the parallel surface 53, but the side surface 30C may not have the parallel surface 53. When one of the intersection surfaces 51 and 52 is a curved surface, the other of the intersection surfaces 51 and 52 may be a flat surface.

In each of the embodiments described above, the plurality of light source LS emit light toward the side surface 30C and the side surface E23. However, the light source LS may be provided to emit light toward the side surface 30C alone.

All of the display devices that can be implemented by a person of ordinary skill in the art through arbitrary design changes to the display devices described above as embodiments of the present invention come within the scope of the present invention as long as they are in keeping with the spirit of the present invention. Various modification examples which may be conceived by a person of ordinary skill in the art in the scope of the idea of the present invention will also fall within the scope of the invention.

For example, additions, deletions or changes in design of the constituent elements or additions, omissions, or changes in condition of the processes arbitrarily conducted by a person of ordinary skill in the art, in the above embodiments, fall within the scope of the present invention as long as they are in keeping with the spirit of the present invention.

In addition, the other advantages of the aspects described in the embodiments, which are obvious from the descriptions of the present specification or which can be arbitrarily conceived by a person of ordinary skill in the art, are considered to be achievable by the present invention as a matter of course.

What is claimed is:

1. A display device comprising:
a display panel including a liquid crystal layer; and
an illumination device overlapping with the display panel, wherein
the illumination device comprises
a transparent substrate having a first main surface opposed to the display panel, a second main surface on a side opposite to the first main surface, and a first side surface connecting the first main surface with the second main surface, and
a light source emitting light toward the first side surface,
the first side surface has a first intersection surface intersecting a thickness direction from the first main surface to the second main surface,
the display panel has a third main surface opposed to the first main surface and a second side surface to which light is emitted from the light source and which is connected to the third main surface,
the first intersection surface is a flat surface connected to the first main surface and inclined in the thickness direction, and
the second side surface is a flat surface inclined in the thickness direction and located on the same flat surface as the first intersection surface.

2. The display device of claim 1, wherein
the liquid crystal layer is a polymer dispersed liquid crystal layer capable of switching a state in which light made incident is transmitted and a state in which the light is scattered, in accordance with applied voltage.

3. The display device of claim 1, wherein
the transparent substrate is a glass substrate.

\* \* \* \* \*